United States Patent [19]

Khandwala et al.

[11] Patent Number: 4,816,658

[45] Date of Patent: Mar. 28, 1989

[54] CARD READER FOR SECURITY SYSTEM

[75] Inventors: Bhupendra J. Khandwala; Jorge A. Young; Sarkis V. Kalustian, all of Claremont, Calif.

[73] Assignee: Casi-Rusco, Inc., Boca Raton, Fla.

[21] Appl. No.: 36,150

[22] Filed: Apr. 3, 1987

Related U.S. Application Data

[63] Continuation of Ser. No. 659,449, filed as PCT US83/00057 on Jan. 10, 1983, published as WO84/02786 on Jul. 19, 1984, abandoned.

[51] Int. Cl.$^4$ .............................................. G06K 5/00

[52] U.S. Cl. ................................ 235/382; 340/825.31

[58] Field of Search ................................ 235/382, 380

[56] References Cited

U.S. PATENT DOCUMENTS

| | | | |
|---|---|---|---|
| 3,308,439 | 3/1967 | Tink et al. . | |
| 3,701,100 | 10/1972 | Yarbrough . | |
| 3,833,885 | 9/1974 | Gentile et al. . | |
| 3,838,395 | 9/1974 | Suttill, Jr. et al. . | |
| 3,842,629 | 10/1974 | Pazer et al. . | |
| 3,845,277 | 10/1974 | Voss et al. . | |
| 3,866,173 | 2/1975 | Moorman et al. . | |
| 3,982,103 | 9/1976 | Goldman . | |
| 3,988,570 | 10/1976 | Murphy et al. . | |
| 4,004,134 | 1/1977 | Hwang . | |
| 4,017,835 | 4/1977 | Randolph . | |
| 4,091,448 | 5/1978 | Clausing . | |
| 4,097,727 | 6/1978 | Ulch | 235/382 |
| 4,114,027 | 9/1978 | Slater et al. | 235/379 |
| 4,187,498 | 2/1980 | Creekmore . | |
| 4,197,986 | 4/1980 | Nagata . | |
| 4,216,375 | 8/1980 | Ulch et al. . | |
| 4,218,690 | 8/1980 | Ulch et al. | 340/825.31 |
| 4,256,955 | 3/1981 | Giraud et al. . | |
| 4,270,043 | 5/1981 | Baxter et al. . | |
| 4,321,672 | 3/1982 | Braun et al. . | |

(List continued on next page.)

FOREIGN PATENT DOCUMENTS

| | | |
|---|---|---|
| 57-41754 | 3/1982 | Japan . |
| 57-108951 | 7/1982 | Japan . |
| 57-108952 | 7/1982 | Japan . |

OTHER PUBLICATIONS

E. Fabo and E. Hoglund, "CTR Computerized Time Recording," *Ericsson Review,* No. 2, (1980).

Wolf-Dieter Haas and Robert Willems, "Zeiterfassung und Zutrittskontrolle mit dem TN-Datensystem Tenodat 9020," *NT-Nacrhrichten Telefonbau und Normalzeit,* Issue No. 84, pp. 47-56, 1982, (In German and English Translation).

*Primary Examiner*—David L. Trafton

*Attorney, Agent, or Firm*—Knobbe, Martens, Olson & Bear

[57] ABSTRACT

There is disclosed herein an improved card reader for a security system utilizing a central controller and a plurality of card readers for controlling traffic through critical doors in a facility. During normal operation, the card readers read card data and send it to the central controller. The central controller makes the decision whether to grant or deny access based upon a comparison of the card data and data kept in memory regarding persons who are authorized access to certain areas. The central controller then sends a "Go" or "No Go" message, i.e., whether or not to grant access, to the reader after the access decision is made. The improved reader includes means for storing the authorized identification code data for persons who will be allowed access during times when communications between the card reader and the central controller are not working. There is also disclosed means for temporarily storing transaction information for transactions made during periods when communications with the controller are lost. During such degraded mode operation, i.e., when communications with the central controller are not working, access is granted to cardholders with the proper system code if their I.D. code data on their cards matches an I.D. code record in a table stored by the central controller in a degraded mode buffer in the reader. The I.D. codes and times of the transactions during degraded mode are, whether "Go" or "No Go", stored in a degraded mode transaction buffer in the reader. When communications are restored, the transactions saved in the transaction buffer are sent to the controller.

25 Claims, 18 Drawing Sheets

U.S. PATENT DOCUMENTS

| | | | |
|---|---|---|---|
| 4,323,771 | 4/1982 | Chalker, Jr. et al. . | |
| 4,355,369 | 10/1982 | Garvin . | |
| 4,358,672 | 11/1982 | Hyatt et al. . | |
| 4,375,032 | 2/1983 | Uchida . | |
| 4,409,657 | 10/1983 | van der Lely . | |
| 4,415,893 | 11/1983 | Roland et al. . | |
| 4,439,670 | 3/1984 | Basset et al. | 235/382 |
| 4,538,056 | 8/1985 | Young et al. . | |
| 4,544,832 | 10/1985 | Young et al. | 235/382 X |

STEPS TO TRANSMIT DATA IN TRANSACTION BUFFER TO CONTROLLER ON POLL SIGNAL

CARD READER FOR SECURITY SYSTEM

This application is a continuation of application Ser. No. 659,449, filed as PCT US83/00057 on Jan. 10, 1983, published as WO84/02786 on Jul. 19, 1984, now abandoned.

BACKGROUND OF THE INVENTION

This application relates to the field of door access security systems and, particularly, to the field of card readers for door access security systems.

Door access security systems, utilizing magnetic card readers at doors to be controlled, are known in the prior art. Such systems include central controllers coupled to a plurality of readers, each of which is located at a specific door to be controlled. Authorized persons wishing to gain accesss through a door, insert magnetic cards into slots in the reader. Magnetic codings on the cards are then read and data is sent to the controller which authorizes or refuses entry and tells the reader either to keep the door locked or unlock the door.

A problem arises when communication between a remote card reader and the central controller is lost. If all access is denied during such times, peoples lives may be endangered. If open access to anyone is granted, security may be breached with no record of who was granted access during the down or degraded mode period.

SUMMARY OF THE DISCLOSURE

There is disclosed herein a card reader for use in a security system for controlling access through key doors, said security system having a central controller and a plurality of card readers, each reader controlling a key door. The card readers read magnetic data stored on cards held by employees, etc. The cards have system code data and I.D. data stored on them magnetically or otherwise. The reader sends the card data to the central controller, when communication is possible, and the central controller then grants or denies access based on the card data by sending a signal to the reader that authorizes or denies permission to the card reader to unlock the door, etc.

The improved card reader can also sense when communications with the central controller are lost and grant or deny access without consulting the controller, based upon data read from the card by comparing the card data to data stored in a degraded mode buffer in the reader, indicating which persons are authorized access during degraded mode times when communication with the central controller is not possible. The data in the degraded mode buffer is loaded from the central controller on a request basis by the reader or central controller or periodically. During times when communications with the central controller are lost, the card reader stores the I.D. data from the card for each employee who was either granted or denied authorization in a transaction buffer for later transmission to the central controller. Both "Go" and "No Go" transactions are recorded and marked as such for later segregation by the controller.

DETAILED DESCRIPTION OF THE PREFERRED EMBODIMENT

Figure 1:
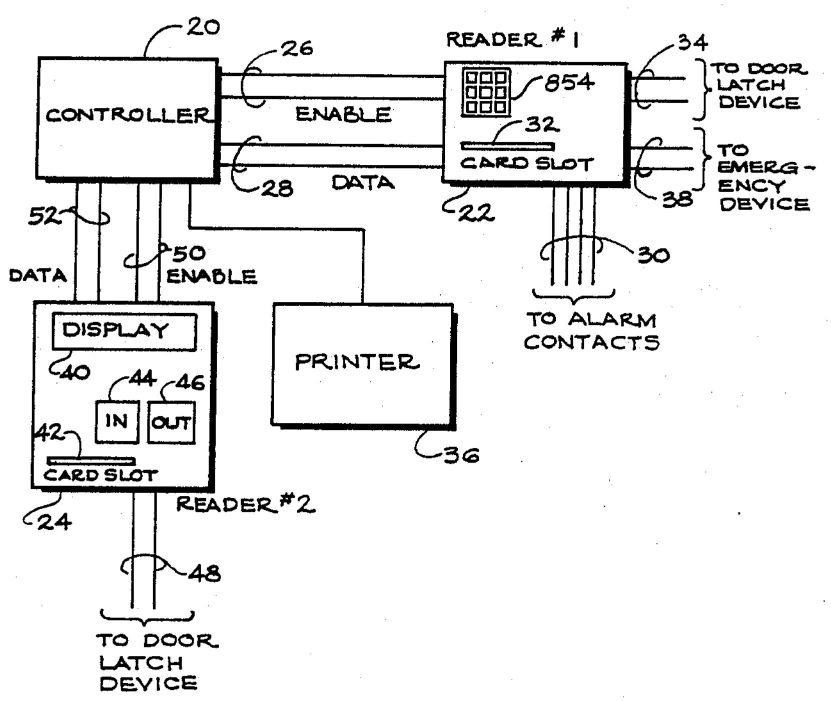
FIG. 1 is a block diagram of a security system in which the improved reader of the invention could be used.

Referring to FIG. 1 there is disclosed a system diagram of a typical magnetic card reading security system. A central controller 20 is coupled to a plurality of card readers of which readers 22 and 24 are typical. The controller 20 is coupled to each reader by an enable pair and a data pair by which the controller can communicate with any card reader in the system.

For example, the controller 20 communicates with the reader 22 by an enable pair 26 and a data pair 28. The controller 20 polls the reader 22 for messages and sends commands to it by the enable pair 26. Data is sent to the controller 20 from the reader 22 via the data pair 28. Serial format is used on both lines.

The reader 22 is typically located at a door that needs to be access-controlled while the controller 20 can be located at some distance from the door. The structural details of the controller 20 are well known in the art, and it can be purchased under the model designation MAC 530/40 from Rusco Electronic Systems in Glendale, Calif. The object code software for the controller is also well known and can be purchased from the same source.

In operation, the reader 22 receives a magnetic card in a card slot 32. The details of a typical magnetic card structure will be found in U.S. Pat. Nos. 3,717,749 or 3,811,977. Other structures could also be used; the details of the structure of the magnetic card are not critical to the invention. Any structure capable of holding data encoded in a card and converting it to electrical signals capable of being transmitted over a line will be satisfactory.

When the card is read during normal operation, the data on the card is stored in a temporary RAM location until a polling signal from the controller 20 arrives on the enable lines 26. Upon receipt of the polling signal on the line 26, the data from the card is transferred on the data lines 28 to the controller 20. The controller 20 processes the data and sends back a "Go" or "No Go" command which causes the reader 22 to take the appropriate action. If the command is "Go", the reader 22 unlocks the door latch via the lines 34 and lights a green LED. If the command is "No Go", the reader 22 lights a red LED and, optionally, energizes a No Go relay.

In some optional embodiments, the cardholder is also required to enter a password comprised of a plurality of digits entered via a keyboard on the face of the reader 22. If the password and the card data are all correct, access will be granted.

Operation during times when communication between the readers and the central controller 20 is not possible, will be referred to herein as degraded mode operation. During degraded mode operation, those readers which are active read the data from cards and make the decision to authorize or deny access locally based upon a comparison of the data read from the card to the data stored in a degraded mode buffer located inside each reader. There is no need for communication with the central controller. The data stored in each degraded mode buffer consists of the I.D. numbers of each employee who is authorized to enter the particular area controlled by the reader during degraded mode times. The specific information for each reader may be different and is loaded in each reader by the central controller 20 periodically or upon a request basis during times when communication between the readers and the central controller is normal.

The reader 22 can optionally also incorporate circuitry to monitor a plurality of alarm contacts connected to the lines 30. When one of the contacts changes state, the reader 22 senses the change and signals the controller 20 on the next poll. The controller 20 can then print out a pre-programmed message on a printer 36. More importantly, the controller 20 can automatically send back a command to cause a switch closure by energizing a relay in the reader 22 or in any other reader in the system. This automatic response can also be any other command that the reader receives normally from the controller. The relay can be connected to an emergency device via the lines 38. The emergency device can be any device such as an automatic phone dialer, a sprinkler system, an alarm or whatever other device that is desired.

The reader 24 is a different type of improved reader which can be used to keep time records for the attendance of hourly employees' on their jobs. The reader 24 has a display 40, a card slot 42, and "in" and "out" buttons, 44 and 46. In operation, an employee would place his card in the card slot 42 and press either the "in" button 44 or the "out" button 46. The data on his card plus the time of day displayed in the display 40 would then be stored in a buffer in the reader 24. Based upon the system code data on the card, the reader 24 would authorize or deny entry to the employee. If entry is authorized by the reader 24 and a green LED will be lit, the door will be unlocked via the lines 48. If entry is denied, the reader 24 will so indicate by lighting a red LED on the face plate. All authorization or denial decisions are made locally by the reader 24 based upon the system code alone on the card, and the data regarding each transaction, such as the I.D. number and the time of day, is stored in the local buffer in the reader 24. Optionally the reader 24 can include a degraded mode buffer which can store the I.D. numbers of those who are authorized to pass during degraded mode time, and will grant or deny access based upon data in this degraded mode buffer during degraded mode times. The data for the transaction, i.e., the I.D. number and the time of day of the transaction is stored in a transaction buffer.

The controller 20 is coupled to the reader 24 by an enable pair 50 and a data pair 52. The controller 20 polls the reader 24 by sending a poll signal on the line 50. Upon receipt of the poll signal, the reader 24 transfers the data for one transaction out of the transaction buffer to the controller 20 via the data lines 52. The controller then can process the data in any fashion including printing it out on the printer 36. The details of the controller 20 are exemplified by U.S. Pat. Nos. 4,216,375 and 4,218,690. The operation of the controller in loading the degraded mode buffers of the readers with the I.D. data for persons authorized to pass during degraded mode times will be explained in more detail below.

The reader 24 can also include means to offset the time displayed in the display 40 from the time kept by the controller 20 in the case that the controller is in a different time zone from the reader. Normally the controller 20 keeps the master time for the system and the reader 24 keeps its own time. Every 15 minutes, the reader 24 inquires the time of the controller 20 and synchronizes the reader's local time with the master time kept by the controller. When the reader 24 is in a different time zone from the controller 20, a group of offset switches in the reader 24 are set to indicate the number of minutes of offset between the local reader time and the controller time.

Figure 2:
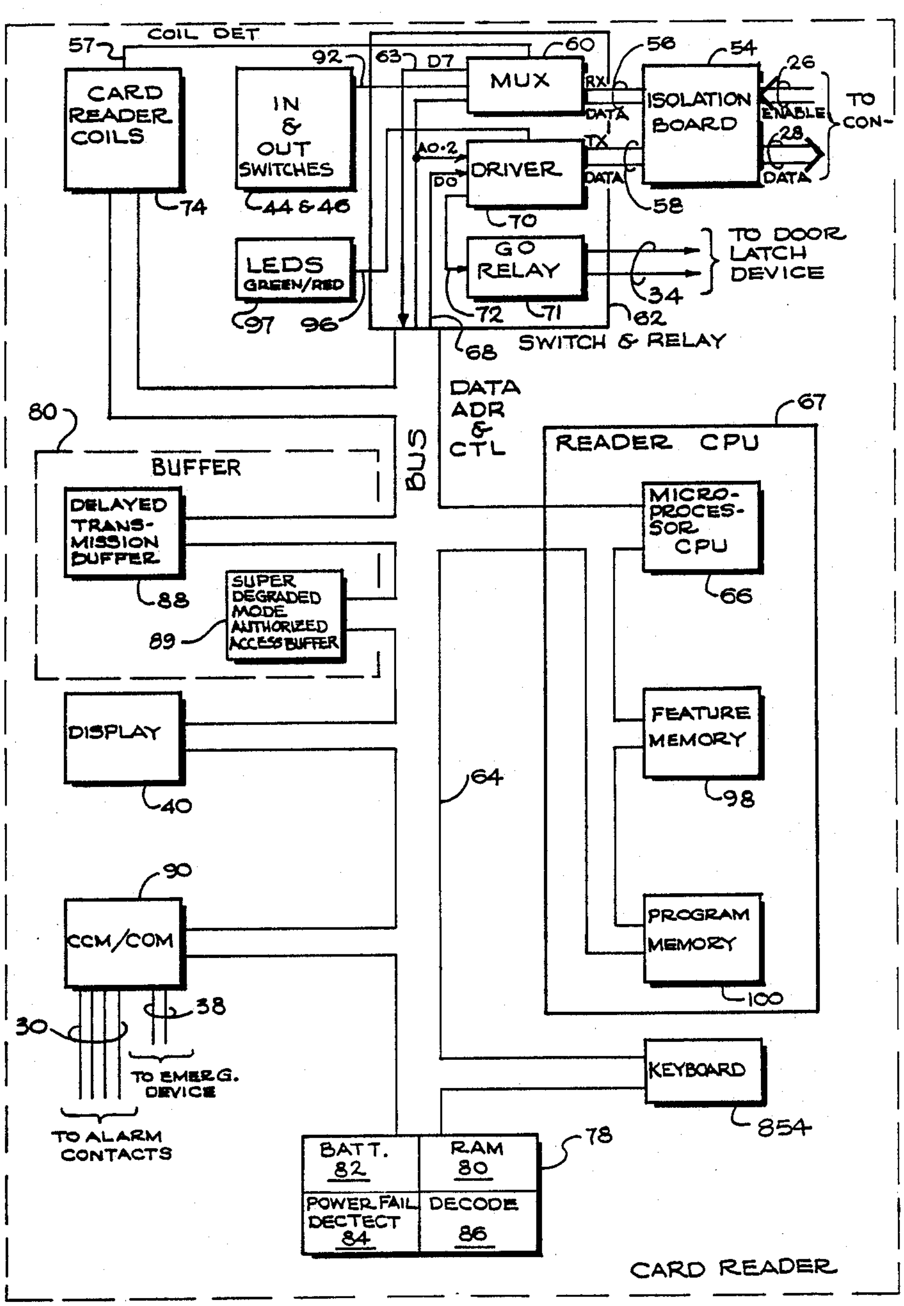
FIG. 2 is a block diagram of the improved reader.

Referring to FIG. 2, there is shown a block diagram of a card reader for use in a security system such as is shown in FIG. 1. Although in reality two different types of readers exist, the core circuits of each type of reader are the same with one type of reader having certain additional optional circuits which the other does not have. FIG. 2 represents a combined functional block diagram of a reader with the common core circuits and with all the optional circuit elements of both types of readers also present.

The card reader of FIG. 2 communicates with the controller 20 of FIG. 1 through an isolation board 54. The isolation board 54 serves to isolate the data on the enable pair 26 and data pair 28 from the logic circuitry of the rest of the card reader. The isolation board 54 passes the signals from the enable line 26 through to the RX data lines 56 and passes the data from the TX data lines 58 through to the data lines 28.

The RX data lines 56 are coupled to a multiplexer 60 in a switch and relay board 62. The purpose of the multiplexer 60 is to select various data channels for connection to a data line D7, 63, of a bus 64. The bus 64 is coupled between the switch and relay board 62 and the data, address and control terminals of a microprocessor CPU 66 on a reader CPU board 67. Address lines AO–A2 from the bus 64 are also coupled to the multiplexer 60. Through these address lines, the CPU 66 causes the multiplexer 60 to select one of the data channels connected to it for connection to its data output coupled to the line D7. The microprocessor 66 can then read the data on the selected data channel through the D7 line 63. In FIG. 2 the only data channels which are shown are the Rx data line 56 through which commands and polling signals are received and the coil detect line 57 which carries data read from the card. Other data channels are used for other features of the reader not relevant to the present discussion.

Data to be transmitted from the card reader to the central controller 20 are input from the DØ line 68 of the data bus 64 to a driver 70. The driver 70 is also coupled to the AØ–A2 address lines of the data bus 64 which supply an address from the microprocessor 66. The driver 70 has several addressable outputs, one of which is the TX data lines 58. The address supplied to the driver 70 causes it to apply the signal on the DØ line 68 to the selected output. To transmit data, the microprocessor 66 places the data to be sent on the DØ bus line and writes the proper address on the address lines AØ–A2 of the bus 64. The serial data on the DØ line is then applied to the TX data lines 58.

The central controller 20 receives the data on the data line 28 and acts upon the data message in some fashion depending upon what the message is and may or may not send a command back to the card reader via the enable line 26.

A go relay 71 is coupled to a door latch device by the lines 34. The lines 34 can be coupled to relay contacts or other switching devices to provide an interruptible current flow path to control whether the door latch is in a locked or unlocked state. The go relay is also coupled to the driver 70 by a switching line 72. The switching line controls the state of the go relay and thereby controls the state of the door latch device. The switching line is addressable by the microprocessor 66 through the driver 70 such that the microprocessor 66 controls the state of the go relay 70.

The microprocessor 66 is also coupled to a card reader coil circuit 74 by the bus 64. The card reader coils 74 consist, in the preferred embodiment, of a plurality of coils coupled to the address and data line of the bus 64 and physically arranged so as to individually magnetically interact with a plurality of magnetized spots on a card inserted in the card slots 42 or 32. The microprocessor 66 can individually address and read each coil in the card reader coil circuit 74 to determine the data in the magnetic spots on the card. The details of the card reading coil circuit are known to those skilled in the art and are not critical to the invention.

The microprocessor 66 is also coupled to an optional display 40 by the bus 64. In readers which are being used for time and attendance functions, i.e., as time clocks, it is desirable that the time of day be displayed externally for the benefit of workers who are lined up and waiting to put their cards into the reader 24 to start or end their work shifts. The display 40 can be any conventional display, and the details of its construction are not critical to the invention.

The microprocessor 66 is also coupled to a random access memory (RAM) board 78. The RAM board 78 contains a RAM buffer memory 80, a battery backup system comprised of a battery 82 and a power fail detect circuit 84. The power fail detect circuit 84 monitors the 12 volt unregulated D.C. voltage derived from the A.C. power line and connects the battery 82 to the power terminals of the RAM buffer 80 when the A.C. line power fails so as to preserve the data stored in the RAM 80. The RAM 80 is selected by the microprocessor 66 through connection of a decoder 86 to the address and control lines of the bus 64. The microprocessor 66 enables the RAM 80 by generating the proper address to select the RAM 80 and placing it on the bus 64 thereby enabling the RAM 80 through the decoder 86. The data to be written into the RAM 80 is then placed on the data lines of the bus 64.

A transaction buffer 88 is also coupled to the microprocessor 66 through the bus 64. The purpose of the transaction buffer 88 is to store transaction data from the magnetic I.D. data on the cards and the local time of each transaction during times when communication with the central controller 20 are lost for persons who were granted or denied access during the degraded mode of operation.

The microprocessor 66 is also coupled to a degraded mode buffer 89 via the bus 64. The degraded mode buffer 89 stores the I.D. data for all persons authorized access during degraded mode operation when no communication with the central controller is possible. The controller 20 can load this data into the degraded mode buffer 89 in any known fashion.

A CCM/COM board 90 is also coupled to the microprocessor 66 by the bus 64. The purpose of the CCM/COM board 90 is, optionally, to monitor the condition of an alarm device or devices external to the card reader and to generate data indicating the condition of the alarm devices for transmission to the central controller. The CCM/COM board 90 also can receive data from the central controller which causes a switch closure on the CCM/COM board. This switch is coupled to an emergency device by the lines 38. The alarm contacts are coupled to the CCM/COM board 90 by the lines 30.

When the card reader is optionally being used for a time and attendance function, the In and Out switches 44 and 46 are used to tell the card reader whether the cardholder wishes to enter or leave an area. The In and Out buttons 44 and 46 are coupled to the MUX 60 in the switch and relay board 62 by the line 92.

Red and green indicator LEDs, represented by block 97 are each coupled to the MUX 60 by the bus 96. The LEDs are used by the microprocessor 66 to signal whether authorization has been granted or denied.

The microprocessor 66 is coupled to a feature memory 98 and to a program memory 100 by the bus 64. The program memory 100 stores the instructions for the microprocessor 66 and the feature memory 98 stores data indicating which software options are in effect for the microprocessor 66.

Figure 3:
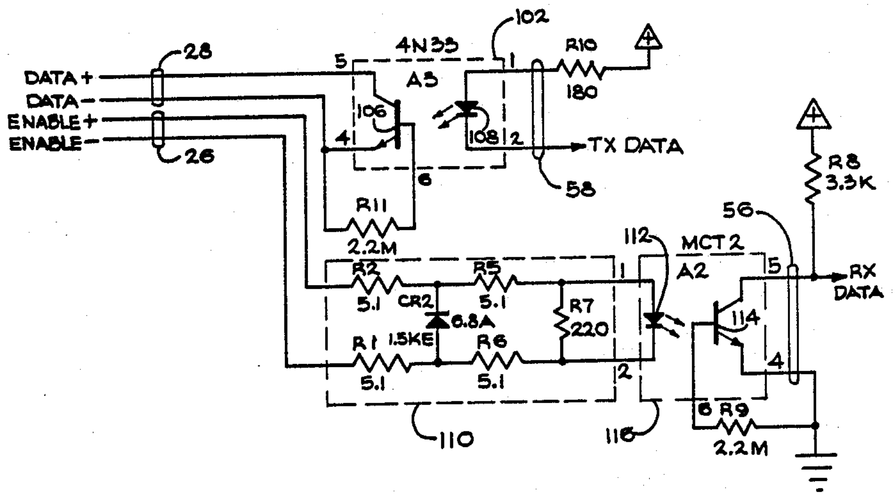
FIG. 3 is a logic diagram of the optical isolator board.

Referring to FIG. 3, there is shown a circuit diagram for the isolation board 54 in FIG. 2. The data lines 28 are coupled to the collector and emitter of a transistor 106 in the optical isolator 102. The light emitting diode 108 of the optical isolator 102 is coupled across the TX data lines 58. When the current is flowing in the TX data lines 58, the LED 108 is energized and emits light causing the transistor 106 to assume one of its two switching states. The opposite state is assumed when the LED 108 is de-energized.

The enable lines 26 are coupled through a noise suppression circuit 110 to the LED 112 of an optical isolator 116. The transistor 114 of the optical isolator has its collector and emitter coupled to the RX data lines 56. In the preferred embodiment, the optical isolator 116 is a Monsanto MCT2. The optical isolator 102 is a Monsanto 4N33.

Figure 4A:
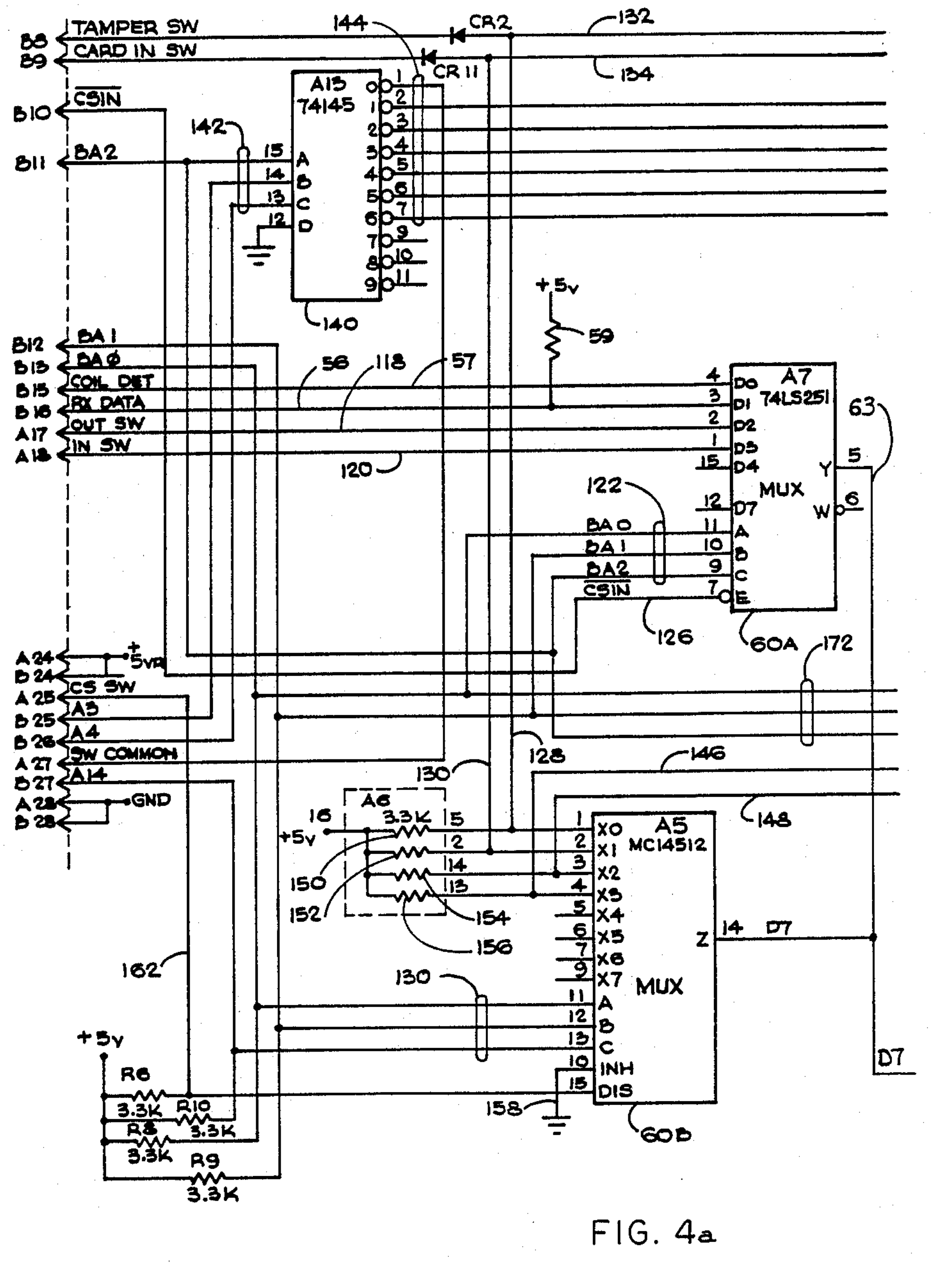
FIGS. 4A and B are a logic diagram of the switch and relay board.
Figure 4B:
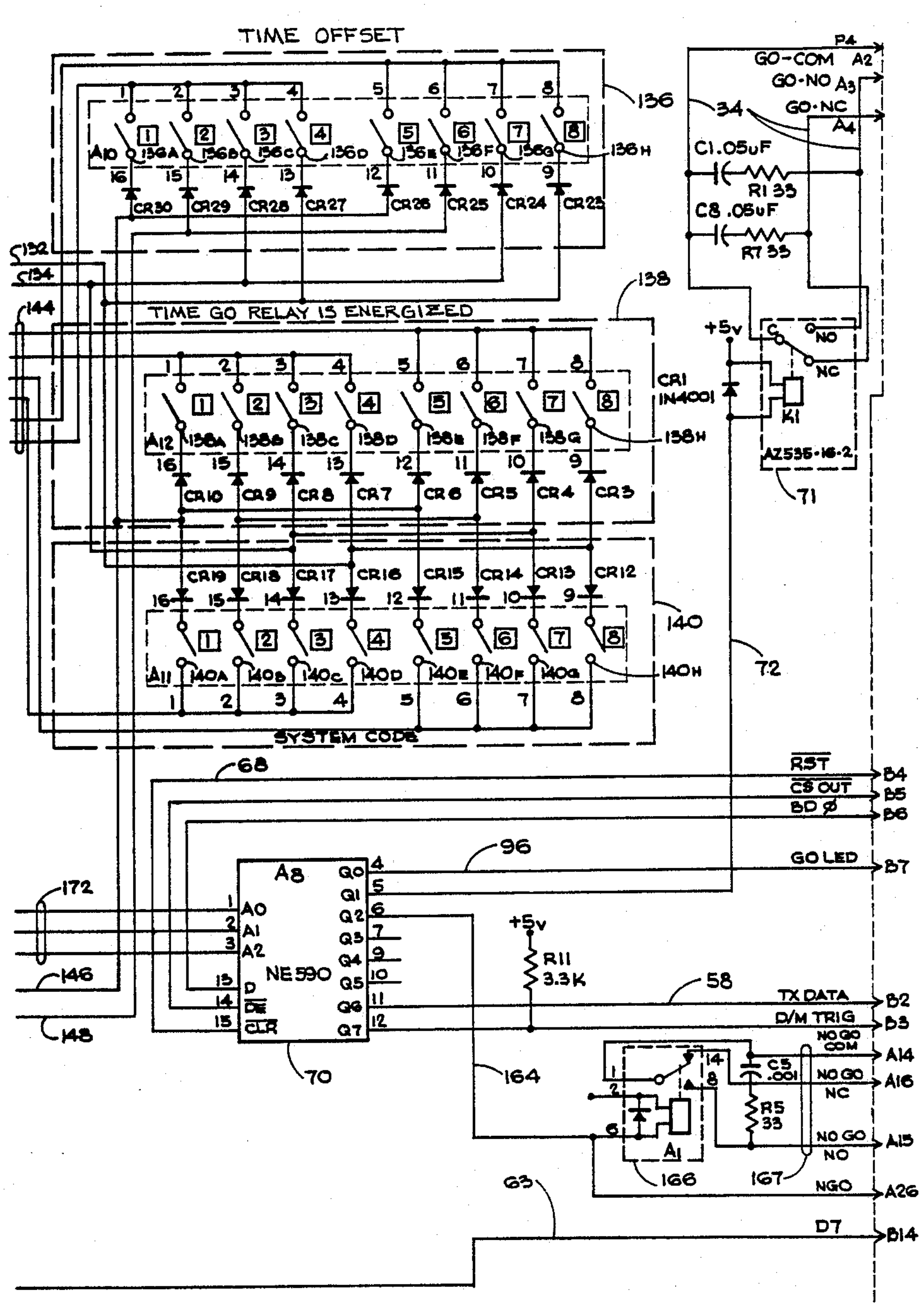

The details of the circuit of the switch and relay board 62 are given in FIGS. 4 A and B which are a logic diagram of that board. The RX data line 56 is coupled to the data input D1 of the multiplexer 60A. A resistor 59 couples a +5 volt supply to the line 56 to positively clamp it at a logic 1 level except where the transistor 114 on the isolation board clamps the line 56 to ground potential. The other data inputs of the multiplexer 60A are coupled to other data channels. For example the card reader coil circuit 74 is coupled to the DØ input of the multiplexer 60A by a line 57. The coil detect signal line 57 carries the data from each coil in the card reader coil circuit 74 as it is addressed by the microprocessor 66. The out switch 46 and the in switch 44 are coupled to the D2 and D3 inputs respectively by the lines 118 and 120.

The address inputs 122 of the multiplexer 60A are coupled to the AØ-2 address lines of the bus 64. The output 63 of the multiplexer 60A is coupled to the D7 data line of the bus 64. The microprocessor 66 controls which of the data inputs are coupled to the data output 63 by the address it supplies on the address lines 122. The chip select input 126 is coupled to the address lines in the bus 64 of the microprocessor 66 through a decoder on the reader CPU board to be discussed more fully below. The microprocessor 66 can enable the multiplexer 60A by writing the proper address on the address lines driving the decoder coupled to the line 126 (not shown).

A multiplexer 60B has its data output coupled to the D7 data line 63. The data inputs of the multiplexer 60B are coupled to various data channels. The XO data input is coupled by the line 128 to a "tamper" switch (not shown). The tamper switch is physically situated so as to change states when the faceplace of the card reader is removed causing an alarm message to be transmitted to the controller 20. The X1 data input is coupled to a "card in" switch (not shown). The "card in" switch is situated so as to change states when a card is inserted in the card slot. By periodically checking the condition of these two switches, the microprocessor 66 can tell whether tampering is occurring or whether there is a card to be read in the card slot.

There are three groups of eight switches on the switch and relay board 62. A time offset group of switches 136 is comprised of 8 switches 136A-H which are used to set a binary number representing the number of minutes of time offset at the local card reader. In those cases where the local card reader is in a different time zone than the central controller 20, the switches 136 are set for the number of minutes by which the local time at the card reader differs from the time at the central controller.

A second group of switches 138 has several purposes. The switches 138A-D are used to set the amount of time that the unlock signal on the lines 34 to the door latch device causes the door latch to remain unlocked. The switches 138A-D also determine the time of energization of a No Go relay 166 and the time the red and green LEDs (not shown) in the block 97 in FIG. 2 are energized during certain times in the operation. The switch 138 E is used to signal whether a 12 hour or 24 hour time display format is desired. The switch 138F is used to enable and disable the buffer RAM 80 as an option. The switches 138G and H are not used.

The switches 140 are used by the customer to set the system code. The system code is one of the items of data which is magnetically stored on each cardholder's card. When the card reader makes the authorization decision locally without consulting the central controller 20, it is the system code stored on the switches 140A-H which is compared to the system code on the cardholder's card to determine if authorization will be granted.

The switches 136, 138 and 140 are individually addressable by the microprocessor 66 through the multiplexers 60A and 60B and a decoder 140. The decoder 140 has address inputs 142 coupled to the address lines in the bus 64. The address supplied on the lines 142 is converted in the BCD to decimal decoder 140 to a logic zero signal on one of the output lines 0-6 which comprise a bus 144. Each of the lines in the bus 144 is coupled to one terminal of a plurality of switches in the switch groups 136, 138 and 140. When the group address appears on the address lines 142, one of the outputs in the bus 144 goes low thereby activating that group. The other terminal of each switch is coupled to the cathode of a diode which has its anode coupled to one of the XO-X3 inputs of the multiplexer 60B via the lines 132, 134, 130, 128, 146 or 148. All of the XO-X3 inputs are also coupled to a +5 volt supply through the resistors 150, 152, 154 and 156. The XO-X3 inputs will be held in a logic one condition except if the line coupling that input is also coupled to a group of switches of which one has been enabled by a logic zero from the decoder 140 and the switch is closed.

The groups of switches coupled to this XO-X3 inputs of the multiplexer 60B intersect with the groups connected to the bus 144 such that for any particular output of the decoder 140 which has been enabled, and for any particular input of the multiplexer 60B which has been enabled, only one switch is coupled to both enabled lines. Thus the microprocessor 66 can individually read each switch in the groups 136, 138 and 140 by changing the address signals on the address lines of the bus 64.

The multiplexer 60B has its inhibit line grounded by the line 158 and its disable input held high by connection through a resistor 160 to a +5 volt supply. The disable input is pulled low to take the D7 output out of the high impedance state when the signal $\overline{CSSW}$ is true on the line 162. The line 162 is coupled to a decoder on the reader CPU board 67 which is coupled to address and control lines of the microprocessor 66 in the bus 64.

Data to be transmitted to the microprocessor 66 is placed on the TX data line 58 by a driver 70. The driver 70 also has several other outputs. For example, the output line 164 can be connected to an optional No Go relay 166. When the line 164 is grounded by the driver 70, a +5 volt supply coupled to the other terminal of the coil of the No Go relay 166 caused current to flow through the relay coil, thereby energizing it and causing the electrical conditions on the lines 168 coupled to the relay contacts to change.

In the preferred embodiment, the decoder 140 is a 74145 type TTL decoder such as is made by Signetics, the MUX 60A is a 74LS251 type multiplexer such as is made by Texas Instruments, the MUX 60B is a MC14512, CMOS type decoder such as is made by Motorola, and the driver 70 is an NE590 type driver such as is made by Signetics.

An output line 96 from the driver 70 is coupled to the GO LED (not shown) to energize it when authorization to make access has been granted. An output line 72 from the driver 70 is coupled to a terminal of the coil of a Go relay 71. When the driver 70 grounds the line 72, a +5 volt supply coupled to the other terminal of the relay coil energizes the coil, causing the relay contacts to change the condition on the lines 34 coupled to the door locking device.

The driver 70 has a data input, the DØ data bit on the line 68, and it has address inputs on the lines 172. The address inputs 172 are coupled to the microprocessor 66 by the bus 64. The address at these inputs determines which of the outputs of the driver 70 will be coupled to the data input 68. The microprocessor 66 can thus write a logic 0 or 1 to any of the outputs of the driver 70 by controlling the address on the lines 172 and the data on the data input line 68 which is coupled to data bit zero of the bus 64. The chip enable and clear inputs are coupled to decoder 250 of FIG. 6C and a gate 282 in FIG. 6B by the Signal lines $\overline{CSOUT}$ and $\overline{RST}$.

Figure 5A:
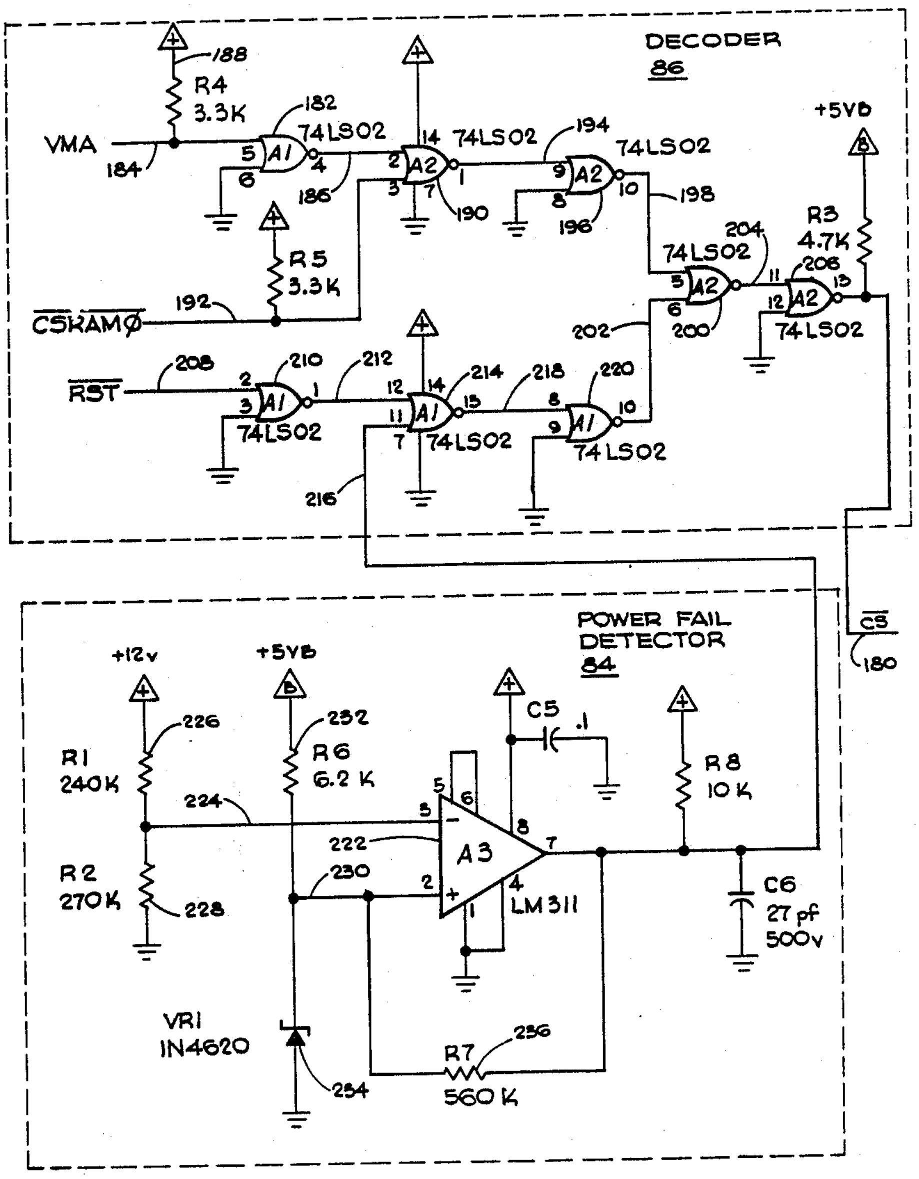
FIGS. 5A and B are a circuit diagram of the RAM buffer board and power fail detect circuit.
Figure 5B:
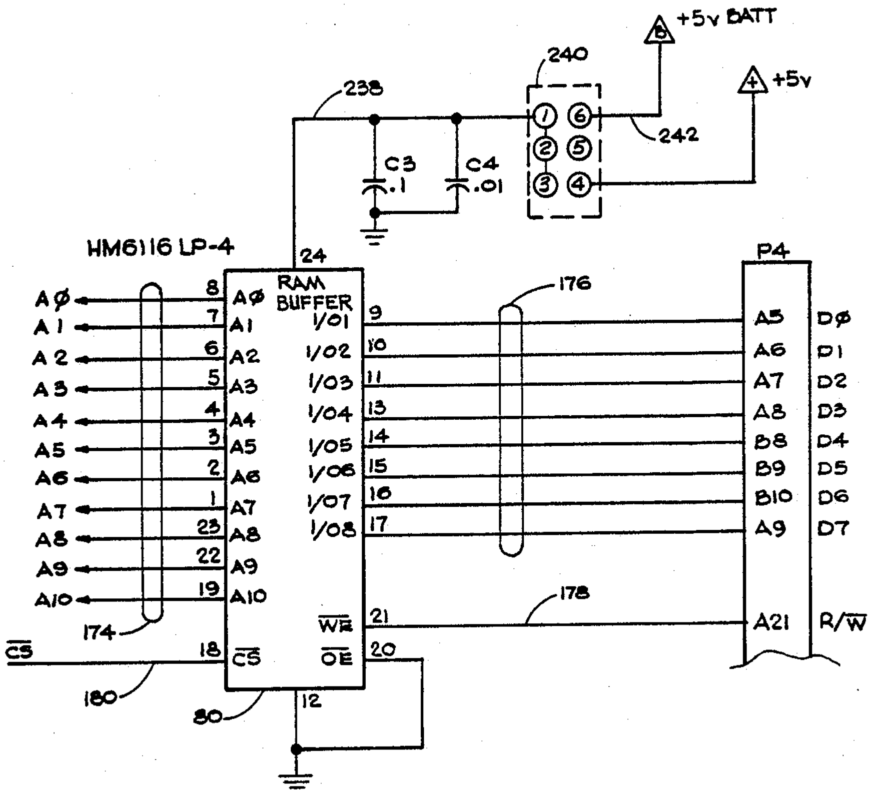

Referring to FIGS. 5A & 5B, there is shown a circuit diagram of the RAM buffer and power fail detect board. The RAM buffer 80 has address lines 174 which are coupled to the address lines of the microprocessor 66 in the bus 64. Data inputs and outputs 176 are also coupled to the microprocessor 66 data lines in the bus 64. A write enable line 178 is coupled to a control line in the bus 64 from the microprocessor 66 to control whether the RAM buffer 80 is reading or writing data through the data lines 176 to the address specified on the lines 174.

A chip select line 180 is coupled to a decoder 86. The decoder 86 has a VMA signal input line 184 coupling one input of a NOR gate 182 to a VMA control line of the microprocessor 66 in FIG. 6B. The VMA signal is true when there is a valid memory address on the address lines 174. Because the other input to the NOR gate 182 is grounded, the NOR gate 182 serves as an inverter with the output on the line 186 false when a valid memory address is present on the address lines 174. The resistor 188 couples a positive voltage supply to the VMA input of the gate 182 to hold it at logic one except when VMA is false. A NOR gate 190 has one input coupled to the output of the NOR gate 182 and the other input coupled to a $\overline{CSRAMO}$ signal from a decoder 248 in FIG. 6C. The CPU 66 can cause $\overline{CSRAMO}$ to be true, i.e., logic zero, and can assert VMA on the line 184. This causes two logic O's at the inputs of the NOR gate 190 and a logic 1 appears on the line 194. This logic 1 is inverted in a NOR gate 196 and appears as a logic 0 on the line 198.

A NOR gate 200 serves to gate a power fail detect signal on a line 202 from a power fail detector 84 through to the chip select input line 180 of the RAM buffer 80 if power fails. When power has not failed, however, the signal on the line 180 controls whether the RAM 80 is selected or deselected. Normally, the signal from the power fail detector 84 on a line 216 is a logic 0 indicating no power failure. When the signal on the line 198 is a logic 0, the RAM 80 is selected because the signal on the line 204 is a logic 1 which is inverted by a NOR gate to assert the $\overline{CS}$ signal on the line 180 at logiz zero thereby enabling the RAM buffer 80 to read and write data.

A $\overline{RST}$ signal on a line 208 comes from a reset circuit on the reader CPU board which will be described below. The $\overline{RST}$ signal is a logic 0 at power up but becomes a logic one 1.2 seconds later as will be explained in connection with FIG. 6B. A NOR gate 210 inverts this signal such that its output line 212 which is coupled to one input of a NOR gate 214 is normally low after power has been on for 1.2 seconds. The NOR gate 214 has its other input coupled to the output of a comparator 222 in the power fail detect circuit 84. The comparator 222 has its inverting input 224 coupled to a voltage reference of approximately 5.3 volts when the power has not failed. The line 224 is held at this reference level by the voltage divider effect of the resistors 228 and 226 which couple a +12 volt D.C. supply to ground.

The non-inverting input 230 of the comparator 222 is coupled to a 3.6 volt reference source derived from battery power. This reference voltage is generated by a resistor 232 which couples a battery 82 (not shown) to ground through a zener diode 234. The zener has a 3.6 volt breakdown voltage, and has its cathode coupled to the line 230. The comparator 222 has a resistor 236 coupled between the output and its non-inverting input to provide positive feedback. The output on the line 216 will be a logic 0 as long as the power has not failed. When the power fails, the battery reference on the line 230 exceeds the voltage on the line 224, and the output on the line 216 rises to a logic 1 level indicating power has failed.

The logic 1 on the line 216 with the logic zero on the line 212 causes the NOR gate 214 to lower its output on the line 218 to a logic zero. This 0 on the line 218 is inverted to a 1 on the line 202 by the NOR gate 220 which causes the output of the gate 200 to change to a 0, thereby deselecting the buffer 80 if it was in a selected condition. When the RAM buffer 80 is deselected, no data may be written into or read out of the buffer. The power input 238 of the RAM buffer 80 will be coupled through any known switching mechanism 240 to the battery 82 (not shown) via a line 242 upon power failure.

Figure 6A:
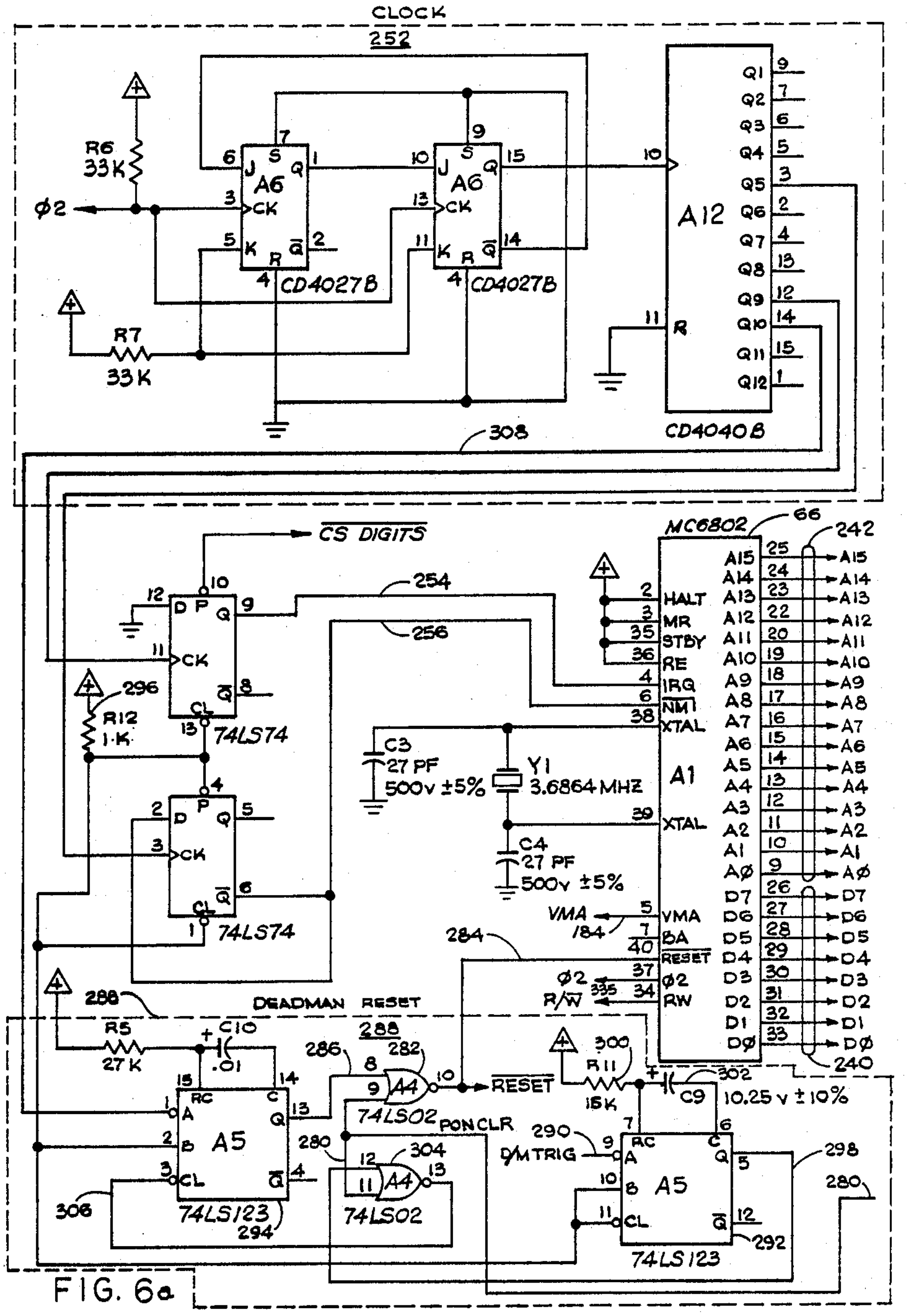
FIGS. 6A, 6B and 6C are circuit diagrams of the CPU reader board.
Figure 6B:
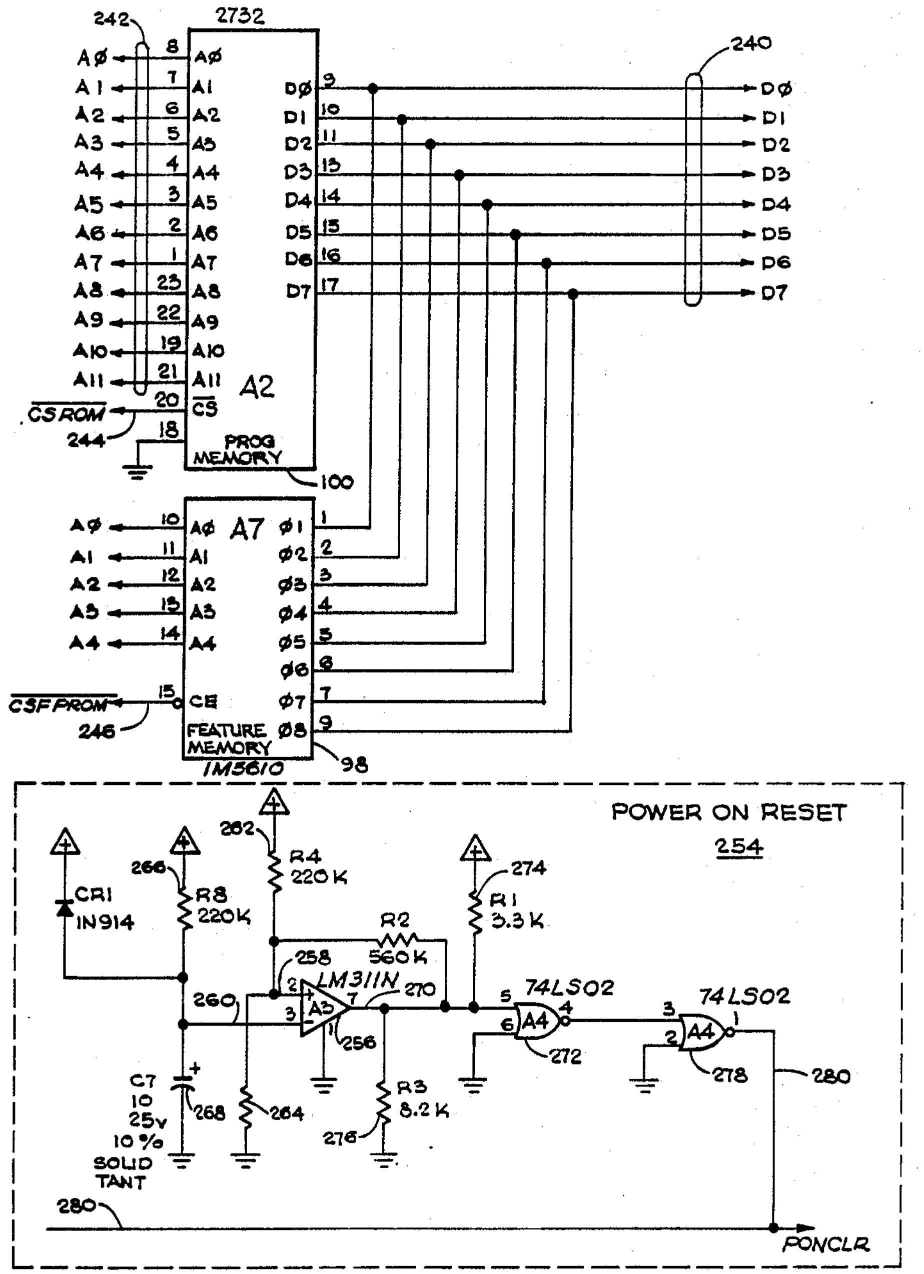
Figure 6C:
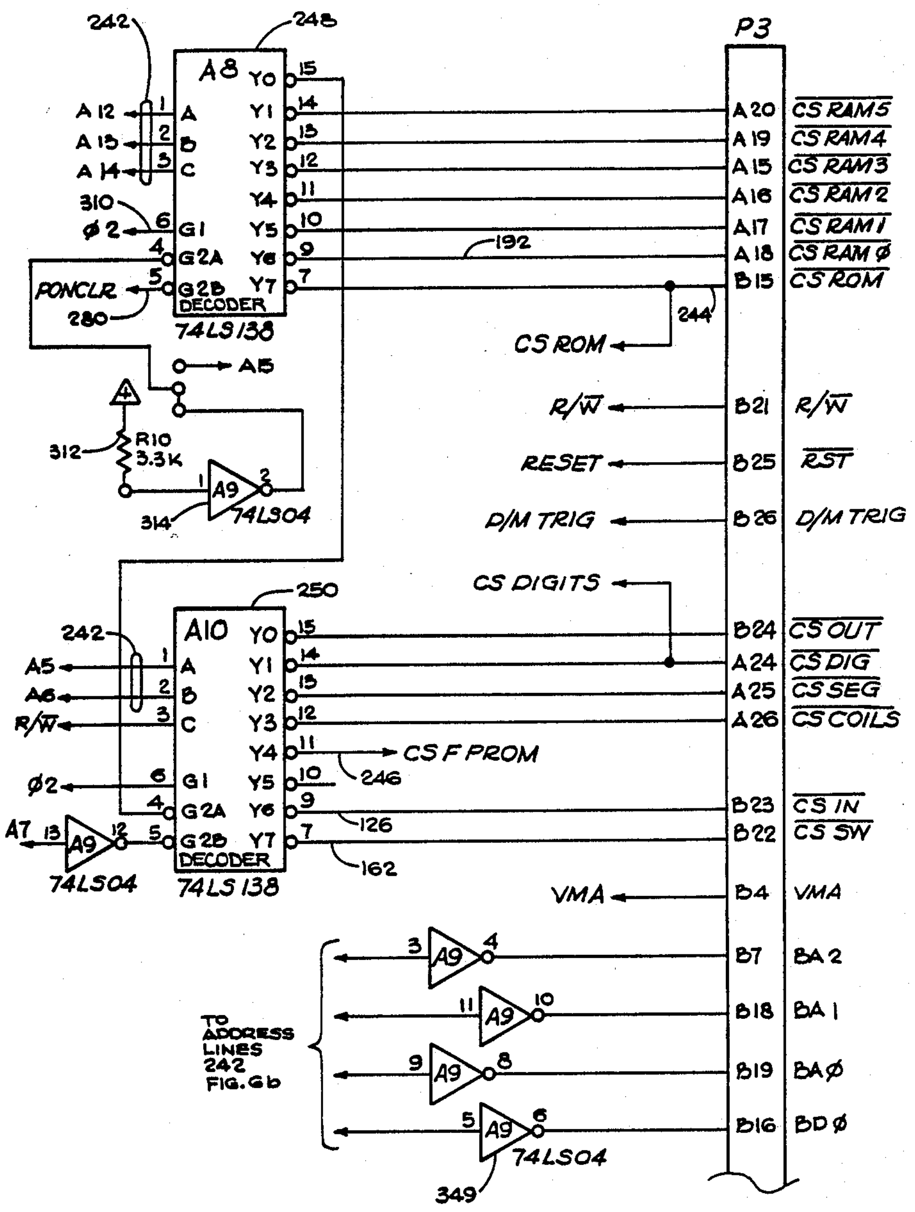

Referring to FIGS. 6A, 6B, and 6C, there is shown a circuit diagram of the reader CPU board. The microprocessor 66 is coupled to a feature memory 98 by data lines 240 and address lines 242. The feature memory contains data regarding which optional features are in effect in the card reader. The microprocessor 66 is also coupled to a program memory 100 by the data lines 240 and the AØ–A4 address lines 242. The enable inputs of the memories 100 and 98 are coupled via the lines 244 and 246 to the microprocessor's address lines 242 through decoders 248 and 250, respectively, in FIG. 6C. A clock 252 generates timing signals for the IRQ and NMI inputs on the lines 254 and 256, respectively. The details of the construction and operation of the clock and of the feature and program memories will be appreciated by those skilled in the art. Any mechanism which generates signals periodically on the lines 254 and 256 will suffice for purpose of the invention.

The microprocessor 66 executes the instructions which are stored in the program memory 100. Within the program there are certain subroutines which accomplish various functions. The IRQ and NMI inputs on the lines 254 and 256 cause vectoring to certain of these subroutines. For example, the IRQ line 254, when asserted true, will cause the program control of the microprocessor 66 to be vectored to a routine which reads all the switches described herein.

When the NMI line 256 is asserted true, the microprocessor 66 is vectored to a transmit routine which transmits data to the central controller 20 via the Tx data lines 58 and data lines 28.

The microprocessor 66 must be reset to the beginning of the program upon the initial application of power to the circuit. A power on reset circuit 254 accomplishes this purpose. A comparator 256 has its non-inverting input 258 coupled to a reference voltage defined by a resistive voltage divider comprised of the resistors 262 and 264 coupling the power supply to ground. The inverting input 260 is coupled to one terminal of a capacitor 268 in an RC circuit comprised of a resistor 266 and the capacitor 268. When the power is first turned on, the capacitor 268 acts as an initital short to ground and the voltage on the line 258 will exceed the voltage on the line 260, and the output of the comparator 256 on the line 270 will be a logic 1. The line 270 is coupled to the input of a NOR gate 272 which acts as an inverter. The resistors 274 and 276 serve as a voltage divider to hold the line 270 in a logic 1 condition except when the comparator 256 asserts the line 270 low.

The logic 1 at power up on the line 270 is inverted once in the NOR gate 272 and again in a NOR gate 278 to become the PONCLR signal on the line 280.

As the voltage on the capacitor 268 rises, it exceeds the voltage on the line 258 at a time determined by the values of the resistor 266 and the capacitor 268. When this happens, the 1 on the output line 270 changes to a 0 and line 280 follows suit. The initial 1 on the line 280 is communicated to the reset line 284 of the CPU 66 as a 0 by passage through a NOR gate 282. The other input to the NOR gate 282 is a line 286 from a deadman reset circuit 288. The line 286 is normally a logic 0 except when there is a problem, as will be described below. With the line 286 normally logic 0, the initial logic 1 on the line 280 is inverted by the NOR gate 282 and resets the microprocessor 66 to the beginning address of the program. Thereafter, the line 280 goes to a logic 0 and stays there.

The deadman reset circuit 288 serves to reset the microprocessor 66 in case there is a software problem. Normally, the deadman reset circuit 288 will attempt to reset the microprocessor 66 periodically unless the software gives a trigger signal "D/M trigger" on the line 290. Thus if for some reason the signal D/M trigger does not occur, program control is lost, and the deadman reset circuit will cause the program counter to be reset to the beginning program location.

The manner in which the deadman reset function is accomplished is through the use of two retriggerable monostable multi-vibrators 292 and 294. The one shot 292 has its B and clear ($R_{D2}$) inputs coupled to a +5 volt source through a resistor 296 and are therefore always in a logic 1 state. The Q output on the line 298 is normally low until a negative transition occurs on the D/M trigger line 290, at which time the 0 output line 298 goes to a logic 1 state for a time determined by the values of the resistor 300 and the capacitor 302 coupled to the external RC circuit terminals. However, the pulse time established by the resistors 300 and 302 is longer than the period of the D/M trigger signal. Thus, the output line 298 will not return to zero after the initial trigger pulse because the D/M trigger signal on the line 90 continues to retrigger the one shot 292.

The signals on the lines 298 and 280 are coupled to the inputs of a NOR gate 304. The output line 306 of the NOR gate 304 is coupled to the clear input of the one shot 294. The B input of the one shot 294 is held in a logic 1 condition by connection to a +5 volt supply through the resistor 296. The A input of the one shot 294 is coupled by a line 308 to the clock 252 and carries a 600 hertz clock signal.

After the initial power up period, the NOR gate 304 will have a logic 0 at the input coupled to the line 280 and a logic 1 at the line 298 input unless the D/M trigger signal on the line 290 does not occur. The output line 306 will remain in a logic 0 state at all times which causes the one shot 294 to ignore all signals at the $\overline{A}$ and B inputs. However, if the D/M trigger signal on the line 290 fails to occur on schedule, indicating some problem with the program execution, the one shot 292 will time out and enable the one shot 294. The clock signal on the line 308 will then trigger the one shot 294 causing a logic 0 to 1 transition on the line 286. This causes the line 284 to drop from logic 1 to 0 and resets the microprocessor 66.

Referring to FIG. 6C, there is shown a logic diagram of the decoder circuitry which forms part of the decoder 86 in FIG. 2. The decoder chip 248 has its select inputs coupled to the AI2–AI4 lines of the address bus 242 of the microprocessor 66. The G1 enable input 310 is coupled to the Ø2 output from the microprocessor 66 which is the clock signal for the rest of the system. The G2A enable input is held low by virtue of being coupled to the output of an inverter 314 which has its input coupled to a logic 1. The G2B input is coupled to the power on clear signal PONCLR on the line 280.

The decoder 250 has its A and B select inputs coupled to the address bus 242 and its C select input coupled to the R/$\overline{W}$ signal from the microprocessor 66. The G1 enable input is coupled to the Ø2 clock signal from the microprocessor 66, and the G2A enable signal is connected to the YØ output from the decoder 248. The G2B enable input is coupled to the A7 line of the address bus 242 from the microprocessor 66.

Both the decoders 248 and 250 are 74L5138 one of eight decoders such as are manufactured by Texas Instruments. The outputs of the two decoders 248 and 250 are coupled to the various chip select inputs in the system as labelled in FIG. 6C. By writing the proper addresses on the address lines 242, the microprocessor 66 can enable any chip in the system needed for a particular operation.

Figure 7A:
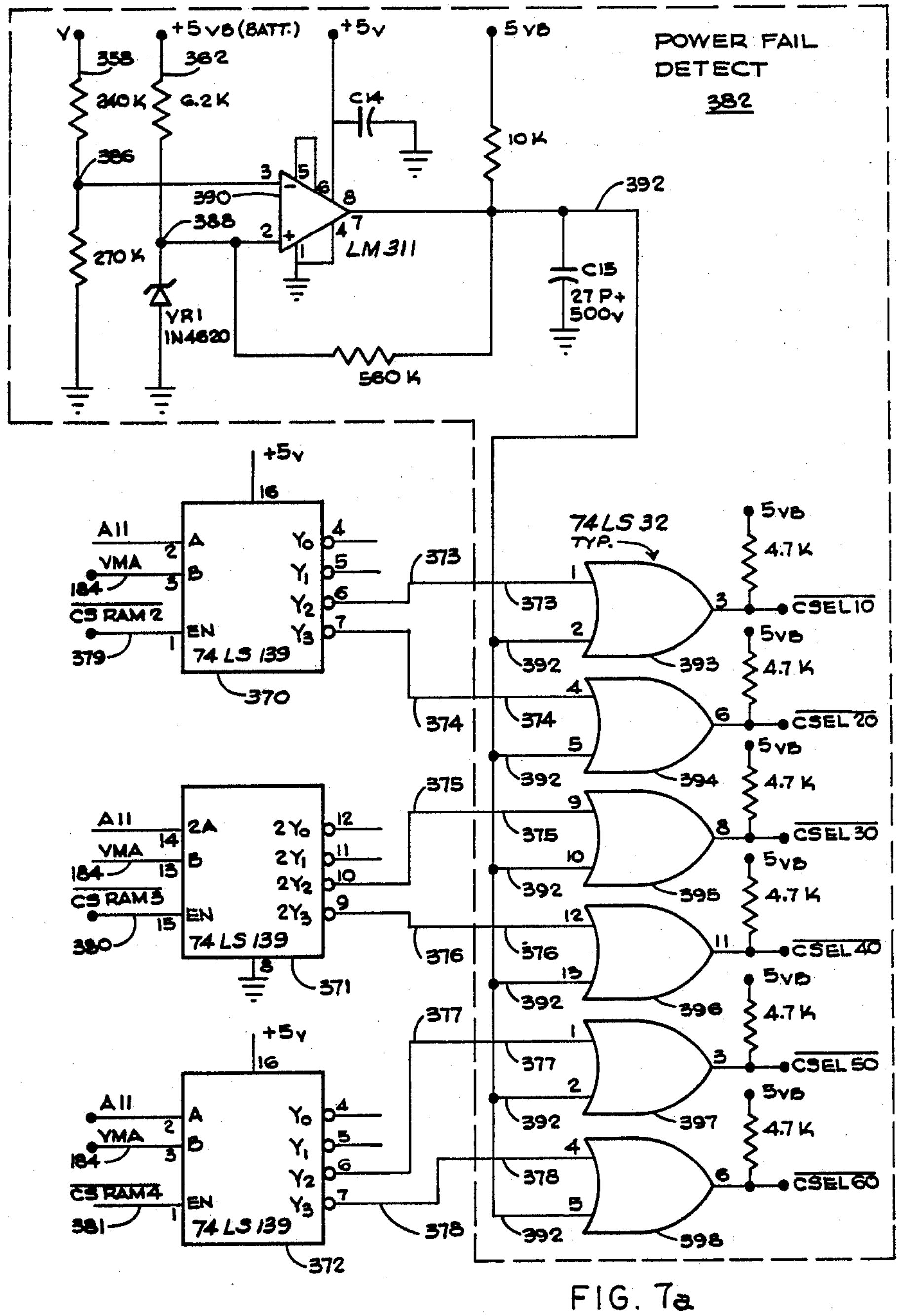
FIGS. 7A and 7B are a logic diagram of the circuitry of the transaction buffer and the degraded mode buffer.
Figure 7B:
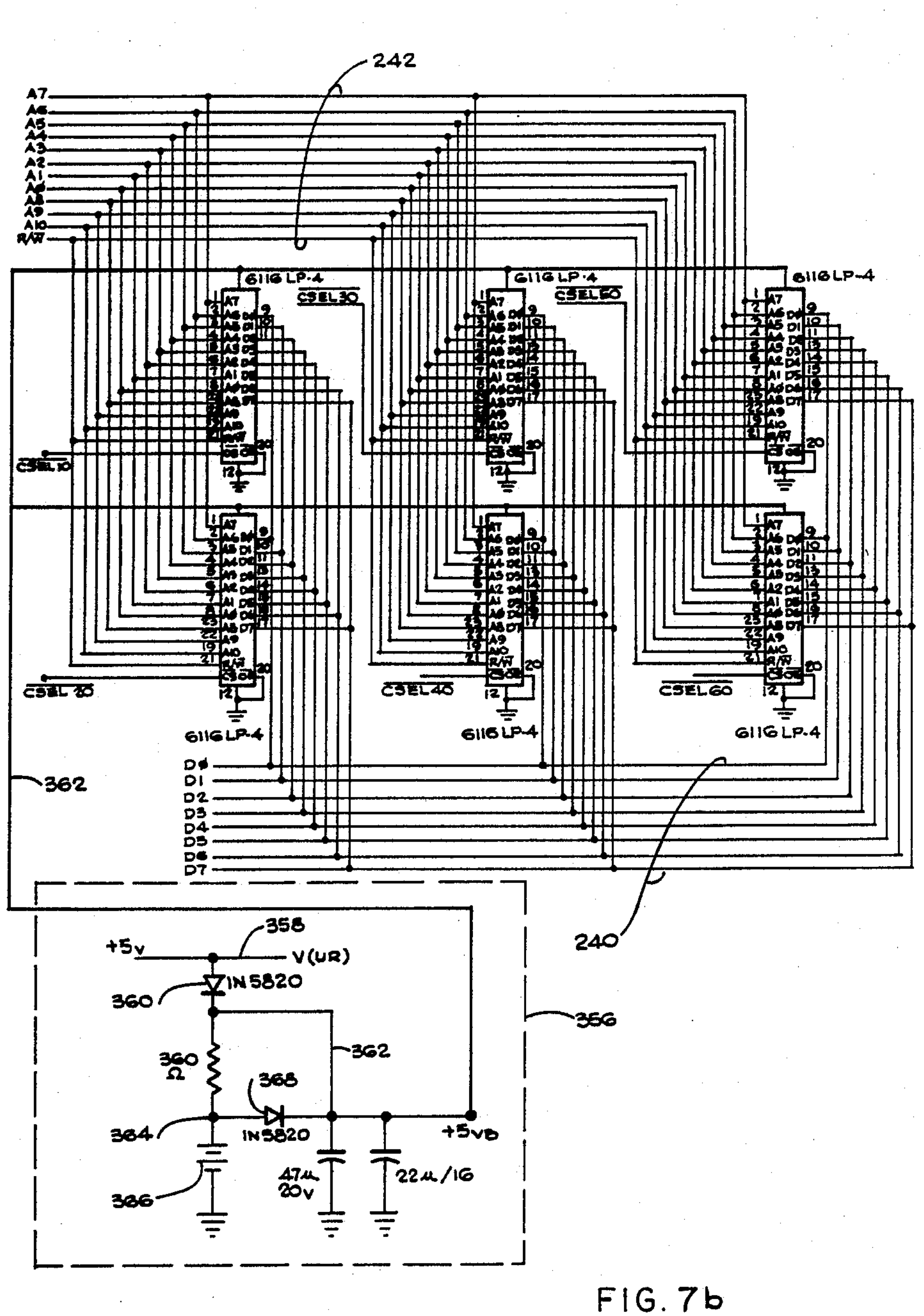

Turning to FIGS. 7A and 7B there is shown a logic diagram of the circuitry of the transaction buffer 88 and the degraded mode buffer 89 of FIG. 2. A battery backup circuit 356 in FIG. 7B serves to protect the information in the RAM chips shown in FIG. 7B upon power failure. Each of the RAM chips is a 6116LP-4 CMOS static RAM such as is manufactured by Hitachi. The +5-volt line supply voltage on the line 358 normally causes a forward bias on the diode 360 and the +5 volt signal is thus coupled to the output line 362. However, when the power fails, the positive voltage on the line 364 from the battery 366 exceeds the voltage on the line 358 which causes a reverse bias on the diode 360. The diode 368, however, will be forward biased such that the battery power will be coupled to the line 362 to keep the information in the RAM intact.

A series of decoders 370–372 are coupled to the A11 line of the address bus 242. These decoders are 74LS139 one of four decoders in the preferred embodiment. The decoders have outputs 373–378 which are coupled to the chip select inputs of the 6 RAM chips of FIGS. 8B through a power fail detect circuit 382. Each decoder has its B enable input coupled to the VMA output 184 from the microprocessor 66 to enable the decoder to read the A11 bit when the decoder has been enabled. The decoders 370–372 are enabled by enable signals on the lines 379–381 coupled to the decoder 248 in FIG. 6C. A power fail circuit 382 senses when the line power represented by the voltage on the line 358 has failed by comparing the voltage at a node 386 maintained by the line to the voltage at a node 388 maintained by a battery. A comparator 390 changes the state of its output 392 when the battery voltage at the node 388 exceeds the line voltage at the node 386. The comparator is a National LM311 in the preferred embodiment.

The chip select signals on the lines 373–378 are individually coupled through 74LS32 OR gates 393–398 to the chip select inputs of the RAM chips in FIG. 7B. Each chip select input is also coupled through the OR gates 393–398 to the output 392 from the comparator 390 such that when the comparator finds a failure of line power, all the RAM chips in FIG. 7B will be deselected so as to maintain the integrity of the data.

The connections and functioning of the RAM chips of FIG. 7B will be apparent to those skilled in the art. Data from the microprocessor 66 is input and output on the bus 240 to and from the memory locations having the addresses on the bus 242.

Figure 8:
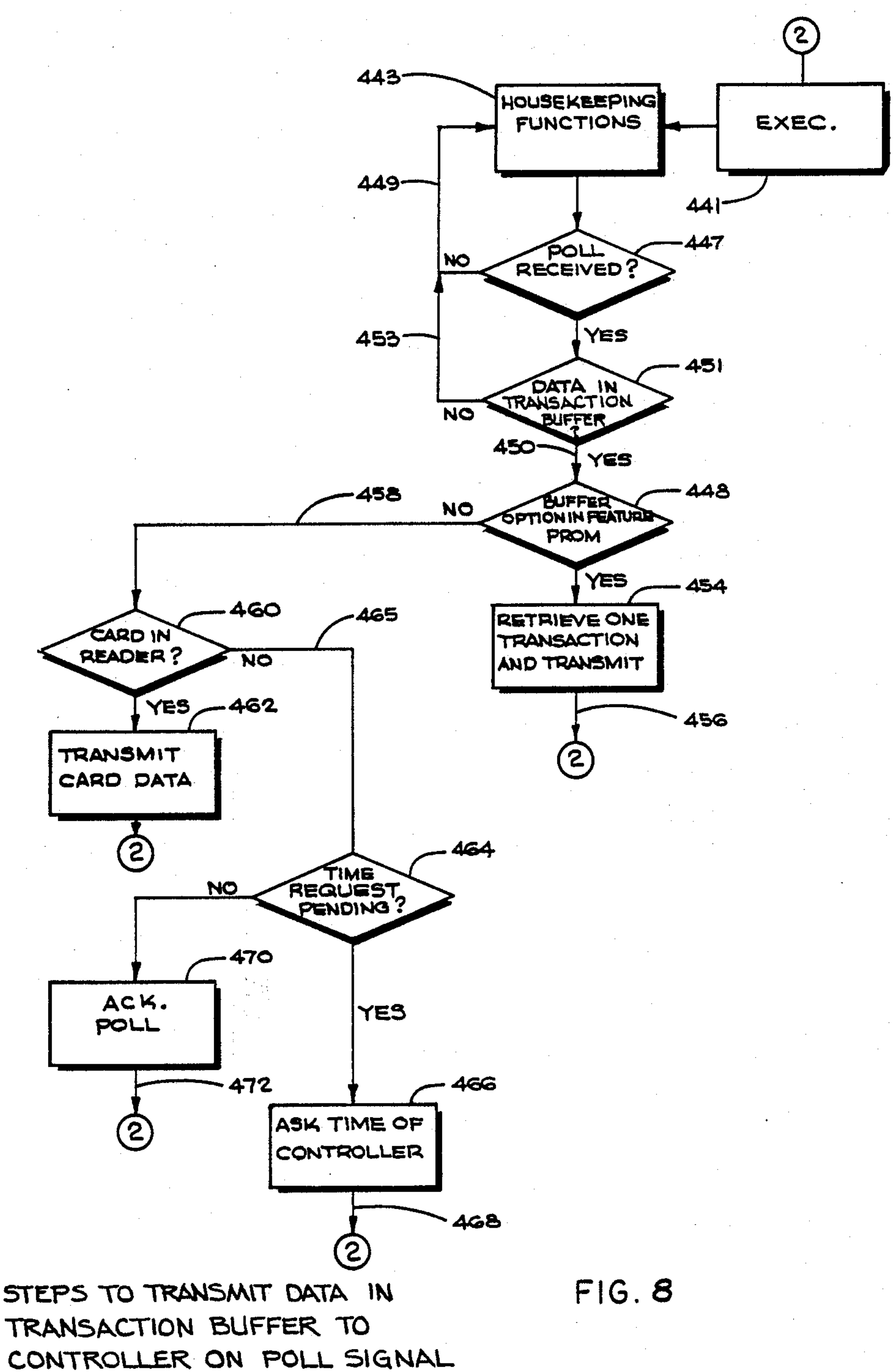
FIG. 8 is a flow diagram for the reader software showing the steps, taken to transmit data in the transaction buffer to the controller.

Turning to FIG. 8 there is shown a flow diagram of the steps which are taken to transmit the data in the transaction buffer 88 to the central controller 20. The steps of FIG. 8 are taken each time a poll signal comes in from the controller 20. The CPU normally operates in an executive mode symbolized by the state 441 in FIG. 8. The executive jumps to various subroutines which perform housekeeping and command scan functions. These subroutines are symbolized by the state 443. One of the functions is to periodically check for the presence of a poll signal from the controller 20 in FIG. 1. The poll signal is sent periodically to each card reader in the system via the enable pair 26 coupled that card reader. The check for the presence of a poll signal is symbolized by the state 447 in FIG. 8. If no poll has been received, the CPU returns to its other housekeeping functions in the state 443 via the path 449.

If a poll has been received, the CPU will check an internal counter which is incremented each time a transaction is stored in the transaction buffer 88. This operation is symbolized by the block 451 in FIG. 8. If the count is non-zero, then, the CPU knows that there is data in the transaction buffer 88 which needs to be transmitted to the central controller 20. Transfer is then made to a state 448 by a path 450. If the count is zero, the CPU returns to its other functions because there is no data to transmit. This transfer is symbolized by the path 453.

In the state 448, the CPU determines if the buffer option flag is set in the feature memory 98 in FIG. 2. If the feature is present, the CPU will retrieve the data for one transaction from the transaction buffer 88 and transmit it to the central controller 20. This operation is symbolized by the state 454 in FIG. 8 and is accomplished by addressing one of the transactions in the transaction buffer 88 and reading the data there by the bus 64. The data is then converted to serial format in the CPU 66 and sent via the DØ data bit line 68 to the driver 70 in FIG. 2. The driver then places the data on the Tx data lines 58 and it is sent through the optical isolator board 54 onto the data line 28 to the central controller 20. The CPU then returns to the executive routine via the path 456.

If the buffer option is not present, the CPU 66 will transfer to a state 460 by a path 458 where it checks for the presence of a card in the card slot. If there is a card in the card reader, the card data will be read by the CPU 66, converted to serial format and transmitted to the central controller 20. This step is symbolized by the block 462. Control is then returned to the executive.

If there is no card in the reader, the CPU will transfer to the state 464 via the path 465 to determine if there is a time request pending. The card readers which have the time and attendance function keep the local time but periodically request the time from the central controller so as to synchronize the local time with the central controller time. If there is a time request pending, the card reader will ask the time of the central controller 20 as symbolized by the state 466 and return to the executive via the path 468.

If no time request is pending, the CPU will acknowledge the poll as symbolized by the state 470 and return to the executive routine by the path 472.

Figure 9:
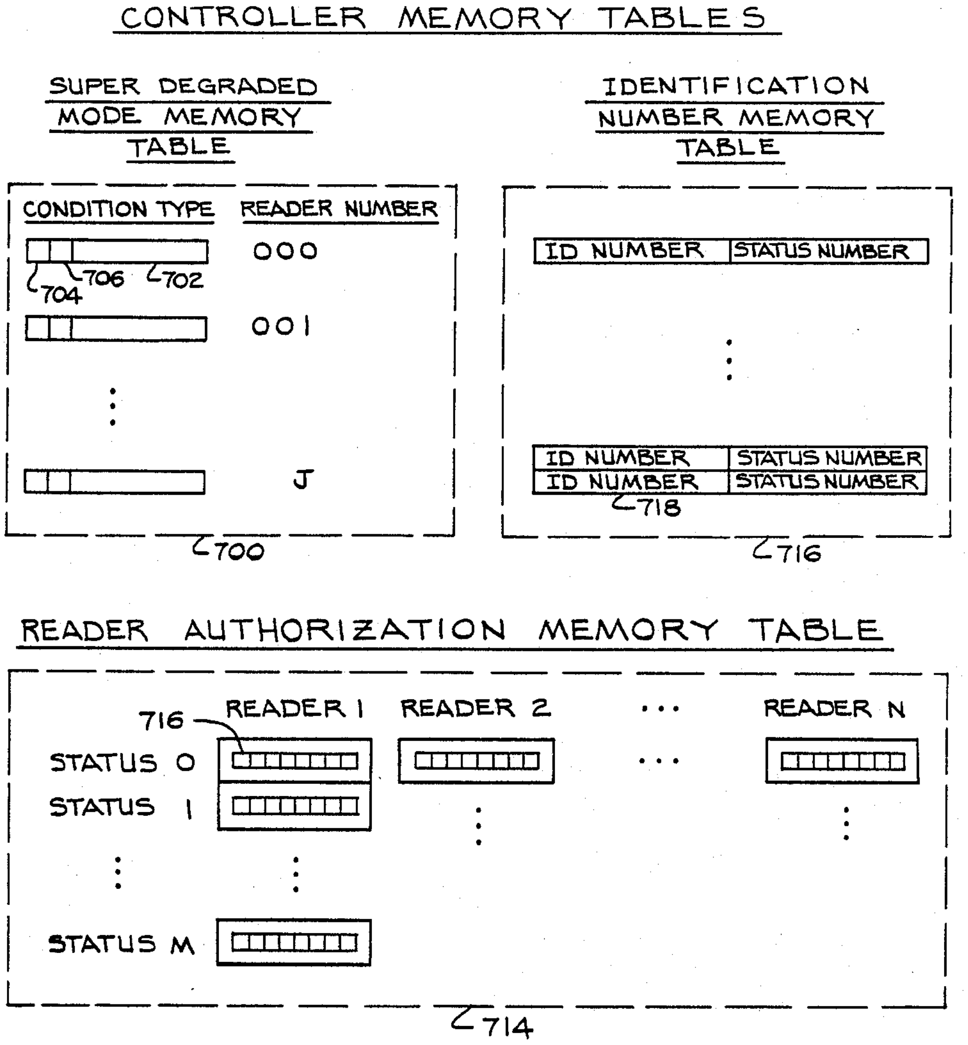
FIG. 9 is a diagram of the memory tables in the controller which are used in performing downloading of degraded mode I.D. data to the card readers.

Referring to FIG. 9 there is shown a symbolic diagram of the memory tables used by the central controller 20 in downloading I.D. data to the readers for use in the super degraded mode. The readers 22 and 24 can request downloading when they are initially turned on since they will not have any I.D. data stored in their degraded mode buffers 89. Also, the control controller 20 can download the degraded mode data to the appropriate readers periodically, at random or whenever the data in the controller memory tables is changed by the user.

Figure 10:
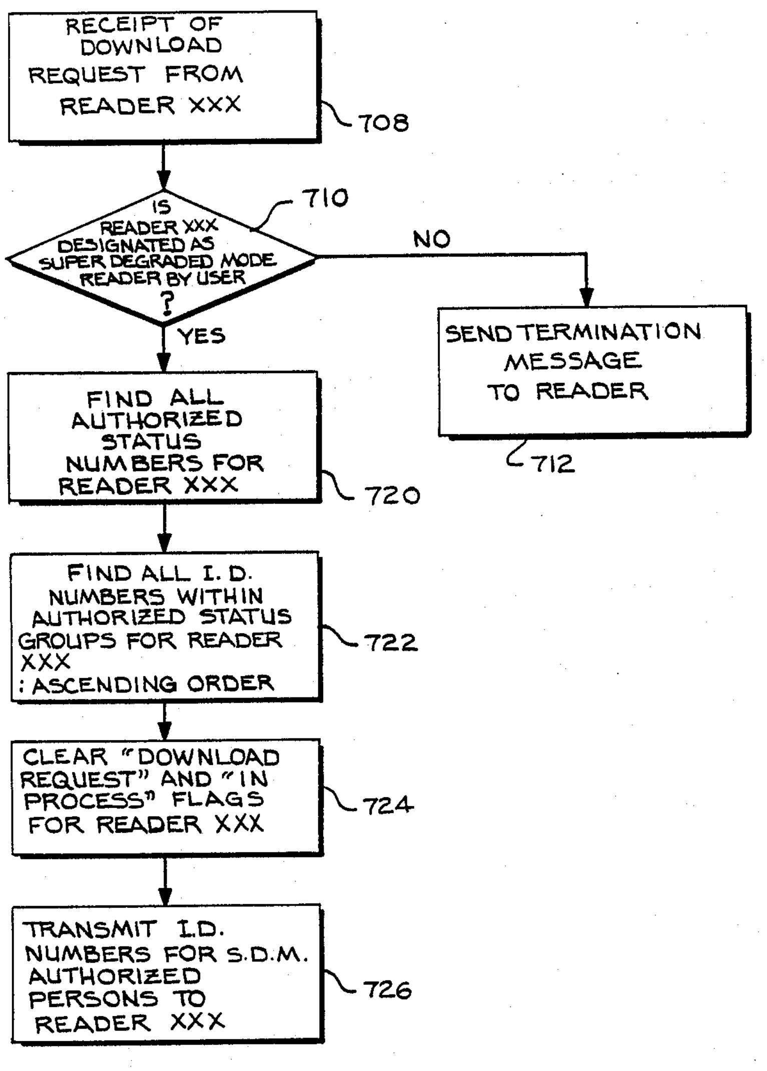
FIG. 10 is a flow diagram for the controller software which details the steps taken by the controller in downloading information to readers.

Referring jointly to FIGS. 9 and 10, the downloading operation will be explained. FIG. 10 shows an algorithm for the software of the controller 20 detailing the steps taken by the controller to download I.D. data to degraded mode readers. Not all readers in a system need be degraded mode readers. The readers which are to be degraded mode are designated by the user by making an entry in the super degraded mode memory table 700. Each reader in the system has an entry in the SDM memory table 700. The reader entries consist of one byte of data of which two bits are used to designate the condition of the reader and the balance is used for other purposes including designating whether or not the particular reader is to be functional in the degraded mode.

The first bit 704 in the table entry for reader number 000 is used to signal whether the reader has a downloading request pending. All readers in the system which have a downloading request pending at any particular time will have the first bit set in the reader entry in the SDM memory table 700. Each downloading request is processed individually until either the degraded mode buffer 89 in the requesting reader is full, and so signals, or the controller runs out of I.D. numbers of employees who are authorized to enter the location controlled by the requesting reader during degraded mode times. After the downloading request by a particular reader has been processed completely, the controller clears the first bit for the reader entry in the table 700, e.g., bit 704 for the reader 000. The controller continues this process until all downloading requests are completely processed.

Referring to FIG. 10, the receipt of a download request from a reader xxx is represented by the block 708. If the controller initiated the downloading operation, it will send a message to the reader commanding the reader to make a downloading request. Either way, a downloading request is made by the reader xxx to the controller. When the controller senses the download request from the reader xxx, it checks the super degraded mode memory table 700 to determine if the reader xxx has been designated by the user as a super degraded mode reader as represented by the block 710. If it has not been so designated, the controller sends a termination message to the reader xxx indicating that there will be no downloading operation as represented by the block 712.

If the reader xxx has been designated as a super degraded mode reader, the controller will consult the reader xxx column in a Reader Authorization Memory Table 714 in FIG. 9. The table 714 contains a column of entries for each reader in the system. Each employee in the system is assigned a specific I.D. number and a specific status number. The status number indicates which controlled areas in the system to which the employee has access. The purpose of the Reader Authorization Memory Table 714 is to correlate which readers are within each status group. Thus the table 714 takes the form of a matrix with an entry for each reader/-status number combination. The entry for each reader/-status number combination is a time zone number. The time zone number for each combination is used for access to a time zone table (not shown) which indicates, at any particular time of day, whether a person with the given status number is authorized to have access to a location controlled by the given reader. If the time zone number for a particular combination is zero, then persons with the given status number are never authorized to enter the location controlled by the given reader. Any reader status number combination which is a non-zero time zone number is a valid combination for super degraded mode. That is, no check of the time zone table is performed in super degraded mode. All I.D.'s in a status group with a non-zero time entry in the table 714 will be sent to the reader. These persons will be authorized entry during super degraded mode operation regardless of what time it is when they put their cards in the reader slot. This is different from normal operation when the cardholder can get in only at the times designated by the time zone.

After the central controller 20 has consulted the Reader Authorization Memory Table 714 column for the reader xxx and determined all status numbers which have non zero time entries, the controller must determine which employees are within the groups with those status numbers. To do this, the controller 20 consults an Identificatin Number Memory Table 716 in FIG. 9. The table 716 has an entry for every employee authorized to have access in the system. Each entry, of which the entry 718 is typical, has an I.D. number and a status number. The I.D. number identifies the particular employee and the status number indicates which areas to which he can have access. The table 716 is arranged in ascending numerical order by I.D. number. The central controller 20, in processing a downloading request from the reader xxx, scans the Identification Number Memory Table 716 in ascending order to find all I.D. numbers that have status numbers which correspond to the status numbers found when the table 714 was consulted for the reader xxx. The location of all authorized status numbers in the table 714 is represented by the step 720 in FIG. 10. The step of locating all the I.D. numbers in ascending order within each authorized status group for the reader xxx is represented by the step 722 in FIG. 10. During the process of collecting the I.D. number for downloading to the reader xxx, the controller 20 sets the "in process" bit for the reader xxx entry in the table 700 comparable to the bit 706 for reader 000.

After the I.D. numbers for the downloading of the reader xxx have been collected, the controller 20 clears the "download request" bit 704 and the "in process" bit 706 for the reader xxx entry in the Super Degraded Mode Memory Table 700. Also, the I.D. numbers collected for the reader xxx are transmitted to the reader xxx for storage in the Degraded Mode Authorized Access Buffer 89 in FIG. 2. These steps are represented by the blocks 724 and 726. Thereafter, the controller 20 waits for the next download request from another reader.

Figure 11A:
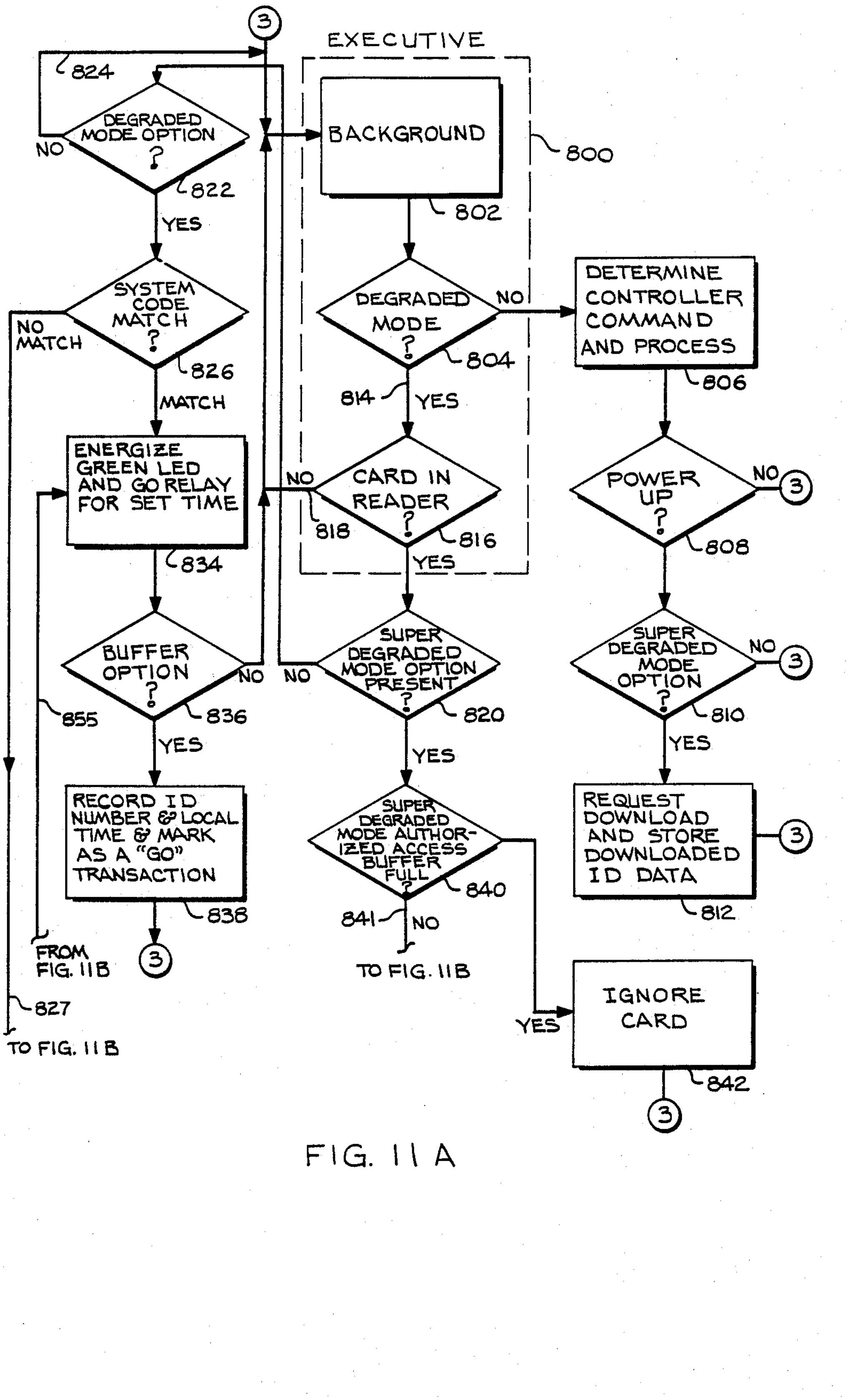
FIGS. 11A and 11B are a flow diagram of the reader software showing the steps taken to authorize or deny access and store transaction data for transactions occurring during degraded and super degraded mode times when communication with the central controller is not possible.
Figure 11B:
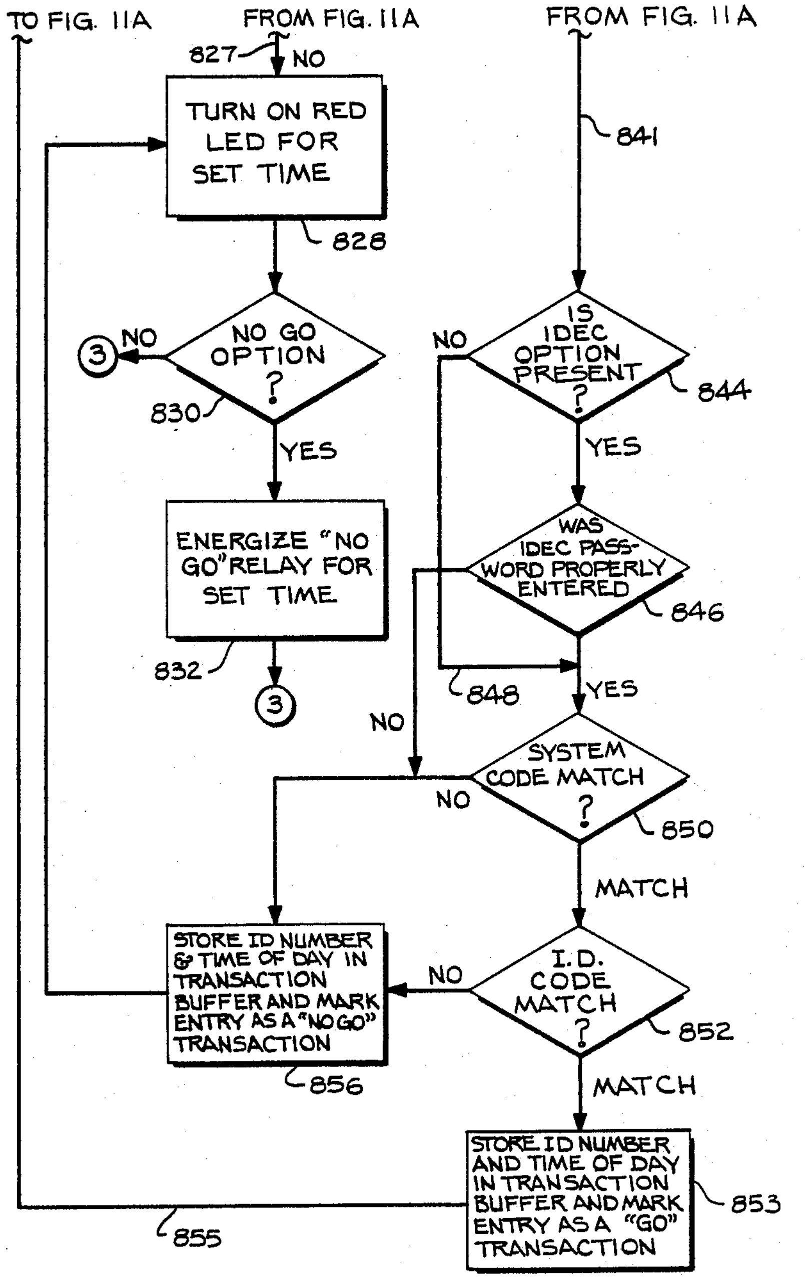

Referring to FIG. 11 there is shown a flow diagram of the steps taken by the reader in processing card data in the super degraded mode. For clarification, each reader in the system can optionally function in either a "degraded" mode or a "super degraded" mode. In both cases, communication with the central controller 20 is not possible but the access decision transaction storage operations are different in each mode. In the "degraded" mode, the reader compares only the system code on the card to the system code set by the user on the reader's switches in FIG. 4B. Optionally the reader will record the I.D. number and the local time in the transaction buffer for transactions where authorization was granted and will mark the entry as a "Go" transaction.

In the "super degraded" mode, the reader will check the system code on the card against the switches and the I.D. data against data in the degraded mode buffer downloaded from the controller. The reader will record all transactions either "Go" or "No Go" in the transaction buffer and mark them as such.

The block 800 in FIG. 11 symbolizes an executive routine part of which is the background block 802 which performs routine housekeeping checks and functions that the card reader does when it is not doing one of the foreground processing routines to handle conditions discovered by the CPU during processing in the executive routine. Part of the normal executive routine is to check for the periodic appearance of a poll signal from the central controller. This check is symbolized by the block 804. If a poll signal has arrived from the controller during the last 30 seconds, the CPU will branch to the block 806 and avoid the degraded mode states. The block 806 represents the normal command processing performed by the reader during times when communications with the central controller are functioning normally, such as reading cards in the slot, sending the card data to the controller for an access decision, receiving a message from the controller either granting or denying access and causing access to be either granted or denied.

The readers in the system which are designated as super degraded mode must load their degraded mode buffers with the I.D. numbers of all those employees who are authorized access during times when communication is lost. There are at least two times when this downloading must occur: first, upon power-up; and, second, upon a change in the information in the tables having to do with the super degraded mode in the central controller. The blocks 808, 810 and 812 represent the power-up downloading. The block 808 represents the determination as to whether the degraded mode buffer 808 needs to be initially loaded after power-up. If a power-up situation is found, the reader CPU will determine whether the super degraded mode option is present in the feature memory as represented by the block 810. Control returns to the executive routine 800 if the reader either is not in a power-up situation or the super degraded mode option is not present.

If the reader CPU finds that both a power-up situation exists and that the super degraded mode option is present, the reader will request a download from the controller, and store the downloaded I.D. data in the super degraded mode authorized access buffer 89 in FIG. 2. This is represented by the block 812. After downloading is completed, control is returned to the executive.

If the reader executive routine has not detected a poll within the last 30 seconds, the reader CPU will enter the degraded mode as symbolized by the path 814 and the states following it.

The reader must first determine whether there is a card in the reader slot as symbolized by the state 816. If there is no card, control is returned to the executive routine as symbolized by the path 818. If there is a card in the reader, the reader CPU will read the card and then check the feature PROM 98 to determine if the super degraded mode option is in effect as symbolized by the state 820. If not, program control will be transferred to a state 822 wherein the reader CPU checks the feature PROM 98 to determine if the degraded mode option is in effect. If it is not in effect, program control returns to the executive routine 800 as symbolized by the path 824.

If the degraded mode option is in effect as determined in the state 822, the reader CPU will compare the system code data on the card in the slot against the system code set on the switches on the switch and relay board 62 as represented by the state 826. If there is not a match, then program control is transferred to a state 828 where the red LED on the front panel of the reader is lit for a time. Some readers will have a "No Go" option in effect. The reader CPU will check the feature memory 98 and determine whether the "No Go" option is in effect as symbolized by the state 830. If it is not in effect, control will be transferred back to the executive. If it is in effect, then the reader CPU will energize a "No Go" relay for a time set by switches on the switch and relay board 62 as represented by the state 832. The No Go relay can be used to ring an alarm or control any other function. Control is then returned to he executive.

Referring again to the state 826, if a match in the system code was found, then the reader energizes a "Go" relay and lights the green LED on the front of the panel as symbolized by the state 834. If the buffer option for the degraded mode is in effect, a determination represented by the state 836, then the reader will store the I.D. number on the card and the local time in the transaction buffer 88. The reader CPU will also mark the record as a "Go" transaction such that when the content of the transaction buffer is later transmitted to the central controller, the "Go" transactions will be printed out in one color whereas "No Go" transactions stored while operating in the super degraded mode can be printed in a different color. This operation of recording and marking the transaction records is symbolized by the state 838. Subsequently, control is returned to the executive 800.

Returning to the state 820 in FIG. 11, if the reader CPU check of the feature PROM 98 indicates that super degraded mode option is in effect, the super degraded mode authorized access buffer must be checked to determine if it is full. This check is represented by the state 840. If it is full, the card in the slot will be ignored as represented by the state 842.

If the super degraded mode authorized access buffer is not full, program control is transferred to the state 844. There the reader CPU checks the feature PROM 98 to determine if the IDEC option is present. If it is present, control is transferred to the state 846 where the reader CPU determines whether the IDEC password was properly entered as represented by the state 846. If the IDEC option is not in effect, the state 846 is skipped as symbolized by the path 848 and the data checking states 850 and 852 are entered. If the IDEC password, comprised of several digits entered from a reader keyboard 854, is not properly entered, the reader enters the state 856.

The state 856 represents the reader CPU operations of storing the I.D. number from the rejected card and the time of day for the transaction and marking the entry as a "No Go" transaction. The transactions in the transaction buffer 88 are marked either "Go" or "No Go" so that they may be printed out in different colors or otherwise segregated by the central controller.

If the IDEC option is present and the IDEC password was properly entered, the reader CPU enters the state 850 to determine if there is a system code match between the card data and the switches. If there is not a match, the state 856 is entered. If there is a match, the reader CPU enters a state 852 to determine if there is an I.D. code match. To make the I.D. code match, the reader CPU compares the I.D. data from the card to the I.D. data in the super degraded mode authorized access buffer 89 which was downloaded from the central controller when communication was possible.

If there is a match with any I.D. record in the buffer 89, the reader CPU enters the state 858 to store the transaction. The state 858 represents the steps of storing the I.D. number from the card and the local time in the transaction buffer 88 and marking the record as a "Go" transaction. Thereafter, the reader CPU enters the state 860 where the Go relay is energized and the Green LED is lit. Control is then returned to the executive routine 800.

After the transaction buffer is loaded and communication with the central controller returns, the reader will transmit the data in the transaction buffer, one transaction at a time to the controller using the algorithms of FIG. 8.

Figure 12:
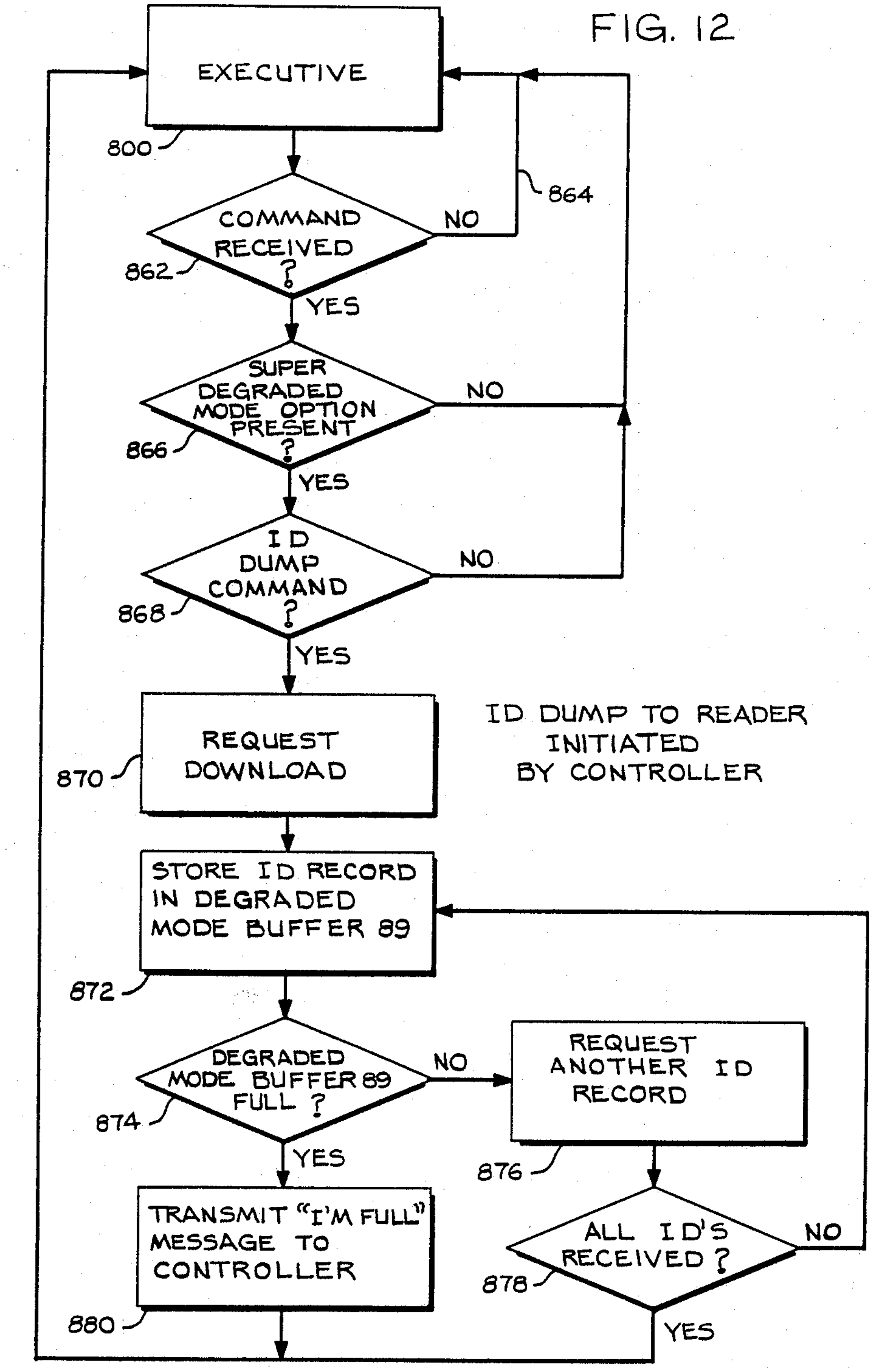
FIG. 12 is a flow diagram of the steps taken by the super degrade mode readers in downloading I.D. data on command from the central controller.

Referring to FIG. 12, there is shown a flow diagram of the steps taken by the readers when the controller 20 requests to dump I.D. data into the super degraded mode buffer. As usual, the reader CPU is functioning in the executive routine 800 when, as part of the routine, the inquiry is made as to whether a command has been received from the controller as represented by the state 862. If no command has been received, the other tasks of the executive routine are continued as symbolized by the path 864.

If a command has been received, the reader CPU enters the state 866 wherein it determines from the feature PROM 98 whether the super degraded mode option is present. If it is not present, then program control is returned to the executive routine 800 to determine what, if anything, to do about the command that was received.

If the super degraded mode option is present, the reader CPU enters the state 868. In this state, the reader determines if the command that was received from the central controller was an I.D. dump command indicating that the controller wishes to download I.D. information from its memory tables. If it was not such a command, the reader returns to the executive routine 800 to determine what to do.

If the command was an I.D. dump command, the reader will enter a state 870 wherein the reader will request a download from the CPU. Thereafter, the reader enters a state 872 wherein the I.D. records coming in from the controller are stored in the super degraded mode buffer 89.

As each I.D. record comes in, the reader CPU stores it as represented by the state 872 and then enters a state 874 to determine if the super degraded mode buffer 89 is full. If it is not full, the reader requests another I.D. record as symbolized by the state 876. The controller 20 may have no more ID's to send so the reader CPU enters a state 878 to determine if the controller has sent a message indicating that it has no more ID's to send. If the controller has sent such a message, control is returned to the executive 800. However, if no such message has been sent, program control is returned to the state 872 to store the next incoming I.D. record.

Returning to the state 874, if the reader CPU finds that the super degraded mode buffer 89 was filled by storage of the last received I.D. record, a state 880 will be entered wherein the reader will transmit an "I'm full" message to the controller indicating it cannot accept any further I.D. records. Control will then be returned to the executive routine.

Below as Appendix A, there is listed the object code of the reader software for performing the super-degraded mode functions described herein.

Although the invention has been described in terms of the preferred embodiment, any variation which accomplish the same functions in a similar means using similar apparatus are intended to be included.

APPENDIX A

```
000 8E 00 7F 96 82 84 EE 27 03 8E 40 8F 7F 00 80 86   FIRMWARE P-N:
010 FF B7 00 80 FE 40 2A 8C 12 34 27 58 CE 00 00 4F   REF.PA 82192
020 A7 00 08 8C 00 64 26 F8 CE 40 00 6F 00 7F 00 80
030 86 FF B7 00 80 96 82 84 0E 26 08 08 8C 40 4A 26   ROM NO: SDM OPTION
040 EA 20 08 08 8C 40 4A 26 E2 20 60 CE 40 90 FF 40
050 2F FF 40 31 FF 40 33 FF 40 35 CE 53 00 FF 40 44   DATE: 22 DEC 1982
060 FF 40 46 86 FF B7 40 3E B7 40 3F B7 40 41 CE 12
070 34 FF 40 2A CE 40 00 6F 00 08 8C 40 2A 26 F8 FE   USED ON:
080 40 2F BC 40 31 27 03 FF 40 31 FE 40 33 BC 40 35   CR501/SDM OPTION
090 27 0E FF 40 35 FE 40 46 BC 40 44 27 03 FF 40 44
0A0 FE 40 37 BC 40 39 27 03 FF 40 39 BD 80 FD 8D 72
0B0 BD 89 9F 96 82 84 E0 27 0B BD 81 54 86 FF B7 40   SOFTWARE:
0C0 21 B7 40 27 0E 7F 00 80 96 27 26 07 BD 83 E3 24   SUPER DEGRADED
0D0 F4 26 F2 7F 00 80 86 FF B7 00 80 BD 82 9C 96 27   OPTION
0E0 26 0E BD 83 E3 24 EC 8D 62 BD 88 69 8D 0F 20 E3
0F0 BD 81 73 BD 83 E3 24 DB 26 D9 7E 80 00 96 82 84
100 0C 27 1E CE 40 01 86 48 A7 00 08 08 08 8C 40 16
110 26 F6 09 09 86 06 A7 00 4A 09 09 09 8C 3F FF 26
120 F5 39 CE 00 0C 6F 00 08 8C 00 64 26 F8 86 FF CE
130 00 07 A7 86 09 8C 00 01 26 F8 36 82 84 02 27 05
140 C6 FF F7 48 08 8D 04 36 7E 83 04 7F 00 27 CE FD
150 A8 DF 16 39 96 82 48 24 05 CE 57 FF 20 0B 48 24
160 05 CE 4F FD 20 03 CE 47 FB FF 40 42 CE 65 DC FF
170 40 48 39 96 28 2A 5E 7F 00 80 86 FF 97 80 96 80
180 84 40 27 52 96 80 84 02 26 4B 96 80 84 01 26 4D
190 7F 00 28 96 5E 84 04 27 0B 96 5E 84 03 D6 3A C4
1A0 03 11 26 23 96 5F 84 0F 91 39 26 1B 96 5F 44 44
1B0 44 44 91 38 26 11 96 82 84 E0 27 05 BD 81 FD 24
1C0 11 CE FF EC 7E 87 9B 96 82 84 E0 27 05 86 F0 BD
1D0 81 FE 7E 87 D0 39 96 82 84 E0 26 A8 39 96 23 26
1E0 AF 96 30 81 04 26 EE BD 8C 4B BD 8C AC 25 09 7F
1F0 00 28 BD 8C 60 7E 81 C7 BD 8C 7F 20 93 4F CE 00
200 00 AA 33 FF 40 2D 16 BD 82 63 24 2C FE 40 2D 08
210 A6 33 48 48 48 48 08 8C 00 06 26 E5 0F F6 40 3E
220 BD 82 63 F6 40 3F 0E BD 82 63 FE 40 35 FF 40 33
230 FE 40 39 FF 40 37 0D 39 7F 00 28 39 7F 00 80 C6
240 FF D7 80 FE 40 39 27 19 09 FF 40 39 FE 40 31 E6
250 00 BC 40 42 26 05 CE 40 90 20 01 08 FF 40 31 0D
260 39 0C 39 7F 00 80 86 FF 97 80 7D 40 3B 26 29 FE
270 40 39 08 FF 40 39 FE 40 35 E7 00 86 FF B7 40 3D
280 BC 40 42 26 05 CE 40 90 20 01 08 FF 40 35 BC 40
290 31 26 07 86 FF B7 40 3B 0C 39 0D 39 96 28 27 2E
2A0 2B 2C 86 10 36 8D 2C 32 49 DE 52 08 DF 52 24 F4
2B0 F6 00 E6 2A 1A D6 81 C4 10 27 01 43 84 0F DE 54
2C0 A7 00 08 DF 54 8C 00 3B 26 04 86 FF 97 28 39 7F
2D0 00 28 39 DE 52 A6 00 43 CE 00 E7 A7 00 44 09 8C
2E0 00 E3 26 F7 08 43 44 09 25 FC 7F 00 80 86 FF 97
2F0 80 0F 86 FF 97 2A 6F 00 01 01 01 01 01 F6 00 C7
300 96 2A 36 0E 86 0F CE 00 E0 A7 00 44 08 8C 00 E4
310 26 F7 32 4D 27 BD 59 39 B1 76 B0 E4 E3 74 D8 E2
320 77 E5 75 D9 E7 78 82 E6 79 71 B3 D5 73 72 B4 D7
330 D6 E8 E1 E0 D1 D0 D4 70 7F 00 2A 7A 00 0A 2A 2E
340 86 07 97 0A 96 02 26 14 96 04 27 22 7F 00 04 96
350 06 97 08 86 09 97 02 7F 00 81 20 12 7A 00 02 27
360 09 96 03 97 81 76 00 08 20 04 86 FF 97 81 96 01
370 27 61 96 03 27 32 2A 41 43 27 15 7A 00 0B 26 62
380 86 08 97 0B 96 C6 43 76 00 09 24 56 7C 00 03 3B
390 7A 00 08 26 4D 7F 00 03 96 C6 2A 2F 96 05 26 42
3A0 73 00 05 96 09 97 07 3B 96 C6 2B 36 86 03 97 06
3B0 86 01 97 03 86 80 97 09 3B 96 C6 2B 0E 7A 00 0B
3C0 26 20 86 FE 97 03 86 08 97 0B 3B 86 80 97 0B 7F
3D0 00 01 3B 96 C6 2A F4 7A 00 0B 26 06 73 00 01 7F
3E0 00 03 3B 0C 96 05 27 19 96 07 7F 00 05 0D 39 36
3F0 7F 00 80 86 FF 97 80 96 04 26 FC 32 97 06 73 00
```

```
400 04 39 96 25 27 15 2A 1D 43 27 08 8D 37 25 20 7C   FIRMWARE P-N:
410 00 25 39 8D 2F 25 14 7F 00 25 39 8D 13 24 10 97   REF.PA 82192
420 31 7C 00 25 39 8D 1D 24 EE 8D 33 86 FE 97 25 39
430 4F CE 04 E0 E6 00 2A 08 4C 08 81 14 26 F6 0C 39   ROM NO: SDM OPTION
440 97 31 0D 39 CE 04 E0 DF 56 96 31 9B 57 97 57 86
450 00 99 56 97 56 DE 56 A6 00 0C 2B D3 0D 39 CE 84   DATE: 22 DEC 1982
460 A6 DF 56 96 31 9B 57 97 57 86 00 99 56 97 56 DE
470 56 A6 00 84 0F 81 0A 27 16 81 0B 27 17 D6 44 D7   USED ON:
480 45 D6 43 D7 44 D6 42 D7 43 97 42 7C 00 30 39 86   CR501/SDM OPTION
490 FF 97 2E 39 CE 00 03 6F 42 09 8C FF FF 26 F8 7F
4A0 00 30 7F 00 2E 39 0A 07 04 01 0F 0F 0F 0F 0B 09
4B0 06 03 00 08 05 02 86 FF 97 80 97 B0 7F 00 B0 BD   SOFTWARE:
4C0 84 02 7A 00 4F 26 26 BD 86 26 BD 87 2D BD 87 5B   SUPER DEGRADED
4D0 BD 86 5C BD 86 A5 BD 89 9F 8D 13 BD 85 8A 8D 2E   OPTION
4E0 BD 85 56 BD 85 DD BD 88 17 86 1E 97 4F 3B 96 80
4F0 84 04 27 19 96 20 27 0E 2A 13 43 27 10 96 E7 2B
500 0C 86 FF 97 20 39 96 E7 2A 03 7C 00 20 39 96 2D
510 26 2D 96 29 27 16 2A 20 43 27 09 96 E6 2B 20 86
520 FF 97 29 39 96 E6 2B 29 7F 00 29 39 4F 97 28 96
530 E6 2A 0C 26 01 97 29 39 96 E6 2B 04 7F 00 29 39
540 86 01 97 28 CE 00 33 DF 54 CE 83 18 DF 52 BD 84
550 94 86 FE 97 29 39 D6 82 C4 01 27 12 96 00 27 0F
560 2A 1A 43 27 17 B6 48 07 2A 1A C6 FF D7 00 39 5F
570 D7 28 B6 48 07 2B 0D C6 01 D7 00 39 B6 48 07 2A
580 04 5F D7 00 39 C6 FE D7 00 39 96 82 84 0C 27 4C
590 B6 40 16 2B 47 CE 40 00 C6 07 F7 40 1A FF 40 18
5A0 7A 40 1A 2B 33 A6 00 27 16 2A 1F 43 27 0D EE 01
5B0 A6 00 2B 16 FE 40 18 86 FF A7 00 0D 56 20 10 EE
5C0 01 A6 00 2A F6 FE 40 18 6C 00 0C 56 20 01 54 FE
5D0 40 18 08 08 08 7E 85 9D 54 F7 40 15 39 96 80 84
5E0 80 26 06 96 82 84 10 27 3C 96 21 27 0E 2A 36 43
5F0 27 33 96 C2 2B 2F 86 FF 97 21 39 96 C2 2A 21 96
600 82 84 10 27 0D 96 24 26 09 86 FF 97 2D 7C 00 21
610 20 0E DE 18 26 0F CE 00 18 96 60 4C 48 7E 87 F7
620 CE 00 00 DF 18 39 36 80 84 20 27 24 96 2D 26 20
630 96 26 27 15 2A 1B 43 27 08 96 C1 2A 13 7C 00 26
640 39 96 C1 2A 10 7F 00 26 39 96 C1 2B 03 7C 00 26
650 39 96 C1 2B F0 86 FE 97 26 7E 87 98 CE 00 EC 8D
660 30 97 61 CE 00 E0 8D 29 97 60 CE 08 E4 8D 22 97
670 5E CE 00 E8 8D 1B CE 00 F4 8D 17 97 5F CE 00 F0
680 8D 0F CE 00 FC 8D 0B 97 63 CE 00 F8 8D 03 97 62
690 39 4F E6 03 59 49 E6 02 59 49 E6 01 59 49 E6 00
6A0 59 49 88 0F 39 CE 00 00 6D 0C 27 23 6C 0D 26 1F
6B0 6C 0C 26 1B DF 56 D6 57 CE 86 D7 DF 4E DB 4F D7
6C0 4F C6 00 D9 4E D7 4E DE 4E EE 00 AD 00 DE 56 08
6D0 08 8C 00 14 26 D2 39 86 EB 87 20 87 65 87 3A 87
6E0 53 87 71 87 6D 87 3D 87 88 87 92 96 2D 26 20 96
6F0 22 81 01 27 10 81 FE 27 0C 96 61 26 13 96 E6 2A
700 1F 86 FF 97 2B 7F 00 86 7F 00 87 C6 FF D7 24 39
710 7F 00 86 7F 00 87 C6 FF D7 24 CE 00 0E 7E 87 F7
720 96 22 81 01 27 61 81 FE 27 5D 7E 87 AE 96 2B 27
730 56 96 E6 2B 52 7F 00 2B 20 E6 96 61 26 0C 96 E6
740 2A 11 86 FF 97 2C 7F 00 85 39 7F 00 85 CE 00 14
750 7E 87 F7 86 FF 97 85 7F 00 2C 39 96 2C 27 28 96
760 E6 2B 24 20 EE 86 FF 97 84 7F 00 24 39 7C 00 21
770 39 96 80 84 40 26 06 96 82 84 E0 27 0A 86 FF 97
780 27 BD 89 89 7F 00 22 39 86 FF 97 83 39 86 FF 97
790 82 39 86 FF B7 48 08 39 CE FF FE DF 0C CE 00 00
7A0 DF 0E DF 10 96 80 84 20 27 03 7F 00 84 39 CE 00
7B0 00 DF 0C DF 0E DF 10 86 FF 97 86 97 87 DE 18 26
7C0 06 97 84 43 97 24 39 96 60 4C 48 CE 00 10 20 27
7D0 96 82 84 E0 27 05 86 FF B7 40 21 96 80 84 10 27
7E0 15 CE 00 00 DF 12 DF 14 CE FF FE DF 12 96 27 27
7F0 25 CE FF EC DF 12 39 6F 00 6F 01 4D 27 18 DF 5A
800 CE FF EC DF 5C DE 5A E6 01 DB 8D E7 01 E6 00 D9   FIRMWARE P-N:
810 5C E7 00 4A 26 F1 39 96 82 84 E0 27 3F 7A 40 26   REF.PA 82192
820 26 3A 86 14 B7 40 26 B6 40 41 26 30 B6 40 40 8B
830 01 19 B7 40 40 81 60 26 23 7F 40 40 B6 40 3F 8B   ROM NO: SDM OPTION
840 01 19 B7 40 3F 81 60 26 14 7F 40 3F B6 40 3E 8B
850 01 19 B7 40 3E 81 24 26 03 7F 40 3E 39 84 0F 81   DATE: 22 DEC 1982
860 05 26 05 86 55 B7 40 21 39 7F 00 80 C6 FF F7 09
870 80 D6 82 C4 E0 27 05 F6 40 25 26 3A 44 44 44 44   USED ON:
880 48 CE 88 96 DF 50 9B 51 37 51 86 00 99 50 97 50   CR501/SDM OPTION
890 DE 50 EE 00 6E 00 8A 03 89 AE 89 AE 89 F2 89 AE
8A0 87 D0 87 98 89 AE 89 4B 89 28 89 74 89 80 89 90
8B0 89 B4 89 CD 89 DF F6 40 22 26 0C 84 0F 26 04 7F   SOFTWARE:
8C0 40 25 39 B7 40 22 39 FE 40 23 A7 00 08 FF 40 23   SUPER DEGRADED
8D0 7A 40 22 26 23 CE 40 1E A6 00 2B 1D C6 FF F7 40   OPTION
```

```
8E0 41 B7 40 3E A6 01 B7 40 3F A6 02 B7 40 40 4F B7
8F0 40 21 B7 40 25 B7 40 41 39 4F B7 40 25 A6 00 84
900 0F BD 8C 92 CE 40 1E A6 01 BD 8C 92 CE 40 1E A6
910 02 BD 8C 92 24 0C FE 40 44 FF 40 46 86 FF B7 40
920 27 39 86 FF B7 40 29 39 BD 89 FE 96 82 84 0C 27
930 0B C6 01 F7 40 16 86 FF B7 40 17 39 86 FF B7 40
940 27 CE 58 00 FF 40 44 FF 40 46 39 BD 89 FE 96 82
950 84 0C 27 08 86 FE B7 40 16 20 DB 39 96 82 84 E0
960 27 F9 86 FF B7 40 21 39 BD 89 FE 96 80 84 08 27
970 3D 7E 87 D0 BD 89 FE 96 80 84 08 27 31 7E 87 98
980 BD 89 FE 96 80 84 08 27 25 86 FF 97 22 7E 87 AE
990 8D 6C 96 80 84 08 27 16 86 01 97 22 7E 87 98 96
9A0 80 84 01 27 09 96 62 84 01 27 04 7F 00 23 39 86
9B0 FE 97 23 39 8D 48 96 82 84 02 27 22 86 01 B7 40
9C0 1D 4F B7 48 08 96 61 CE 00 1E 7E 87 F7 8D 2F 96
9D0 82 84 02 27 09 4F B7 48 08 86 AA B7 40 1D 39 8D
9E0 1D 96 82 84 02 27 F7 86 55 B7 40 1D 86 FF B7 48
9F0 08 39 86 FF B7 40 25 CE 40 1E FF 40 23 39 86 10
A00 7E 8B 4A 01 96 20 27 15 2B 08 73 00 20 86 80 7E
A10 8B 2D 43 26 08 7F 00 20 86 80 7E 8B 2D 96 21 27
A20 33 2B 15 73 00 21 96 2D 27 09 86 80 BD 83 EF 4F
A30 7E 83 EF 86 20 7E 8B 2D 43 26 19 7F 00 21 96 2D
A40 27 0D 7F 00 2D 86 80 BD 83 EF 86 40 7E 83 EF 86
A50 10 7E 8B 2D 96 82 84 0C 27 5B B6 40 16 81 01 26
A60 0D 7F 40 16 86 80 BD 83 EF 86 81 7E 83 EF 81 FE
A70 26 0D 7C 40 16 86 80 BD 83 EF 86 82 7E 83 EF 96
A80 82 84 0C 27 6C B6 40 16 26 45 CE 40 00 C6 04 96
A90 82 84 08 27 02 C6 07 F7 40 1B 5F 7A 40 1B 2B 2F
AA0 5C A6 00 27 25 2B 11 63 00 4F 1B 36 86 80 BD 83
AB0 EF 32 7E 83 EF 7E 8A F1 43 26 0F 6F 00 86 40 1B
AC0 36 86 80 BD 83 EF 32 7E 83 EF 08 08 08 20 CC B6
AD0 40 17 27 1D 7F 40 17 86 80 BD 83 EF 86 20 BD 83
AE0 EF B6 40 15 84 7F D6 82 C4 08 26 5E 84 0F 7E 83
AF0 EF 96 22 27 13 2B 07 73 00 22 86 40 20 2F 43 26
B00 07 7F 00 22 86 30 20 25 96 82 84 02 27 3F B6 40
B10 1D 81 01 27 1E 81 AA 26 09 86 FE B7 40 1D 86 60
B20 20 0B 81 55 26 27 86 FE B7 40 1D 20 0F 36 8D 14
B30 32 20 17 86 FE B7 40 1D 86 50 20 F1 86 70 20 ED
B40 86 FF 20 06 96 81 48 48 48 48 7E 83 EF 96 28 2A
B50 54 96 5E 84 04 27 21 96 5E 84 03 D6 3A C4 03 11
B60 26 11 96 5F 16 84 0F 91 39 26 08 54 54 54 54 D1
B70 38 27 05 CE 00 00 DF 38 96 80 84 02 26 24 96 80
B80 84 01 26 1B 8D BE 4F CE 00 00 AA 33 8D BC 08 A6
B90 33 48 48 48 48 08 8C 00 08 26 EF 7F 00 28 39 7E
BA0 8C 28 7E 8C 16 96 82 84 E0 27 2F BD 82 3C 24 3D
BB0 86 03 B7 40 2C 86 70 BD 83 EF 17 BD 83 EF BD 82
BC0 3C 17 BD 83 EF 7A 40 2C 2A F4 7F 40 3B FE 40 31
BD0 FF 40 2F FE 40 39 FF 40 37 39 7E 8B 40 B6 40 21
BE0 27 F8 86 30 BD 83 EF 86 01 BD 83 EF 39 B6 40 27
BF0 27 0E 86 30 BD 83 EF 86 10 BD 83 EF 7F 40 27 39
C00 B6 40 29 27 D8 86 30 BD 83 EF 86 11 BD 83 EF 7F   FIRMWARE P-N:
C10 40 29 39 7E 8B 84 96 2E 27 C0 BD 8B 84 96 43 48   REF.PA 82192
C20 48 48 48 9A 42 7E 83 EF 96 23 26 E7 96 30 81 04
C30 26 A8 86 50 BD 83 EF 8D 12 BD 8C AC 25 07 8D 20   ROM NO: SDM OPTION
C40 86 F0 7E 8B 87 8D 38 4F 7E 8B 87 CE 00 06 A6 33
C50 A1 3B 27 03 7F 00 2F A7 38 09 8C 00 01 26 EF 39   DATE: 22 DEC 1982
C60 96 31 84 40 27 18 7C 00 2F 96 62 44 84 07 4C 91
C70 2F 26 0B 7F 00 82 7F 00 2F CE FF C4 DF 1A 39 96   USED ON:
C80 81 84 20 27 0C 96 2E 27 08 7F 00 83 CE FF C4 DF   CR501/SDM OPTION
C90 1C 39 7F 00 80 C6 FF F7 00 80 FE 40 44 A7 00 08
CA0 FF 40 44 BC 40 48 26 02 0C 39 0D 39 8D 20 7F 00
CB0 58 CE 00 00 A6 46 DF 50 97 59 DE 58 A6 33 DE 50   SOFTWARE:
CC0 A1 42 26 08 08 8C 00 04 26 EA 0D 39 0C 39 96 63   SUPER DEGRADED
CD0 44 44 44 44 44 97 32 4F C6 04 CE 00 4A 91 32 26   OPTION
CE0 01 4C A7 00 08 4C 5A 26 F4 7F 00 58 96 63 44 44
CF0 44 84 03 97 59 DE 58 A6 4A 97 49 43 A7 4A 96 63
D00 44 84 03 97 59 DE 58 A6 4A 2A 01 43 97 48 43 A7
D10 4A CE 00 49 08 A6 00 2B FB 97 47 08 A6 00 2B FB
D20 97 46 96 63 84 01 27 08 96 47 D6 46 97 46 D7 47
D30 39 00 00 00 00 00 00 00 00 00 00 00 00 00 00 00
D40 00 00 00 00 00 00 00 00 00 00 00 00 00 00 00 00
D50 00 00 00 00 00 00 00 00 00 00 00 00 00 00 00 00
D60 00 00 00 00 00 00 00 00 00 00 00 00 00 00 00 00
D70 00 00 00 00 00 00 00 00 00 00 00 00 00 00 00 00
D80 00 00 00 00 00 00 00 00 00 00 00 00 00 00 00 00
D90 00 00 00 00 00 00 00 00 00 00 00 00 00 00 00 00
DA0 00 00 00 00 00 00 00 00 00 00 00 00 00 00 00 00
DB0 00 00 00 00 00 00 00 00 00 00 00 00 00 00 00 00
DC0 00 00 00 00 00 00 00 00 00 00 00 00 00 00 00 00
DD0 00 00 00 00 00 00 00 00 00 00 00 00 00 00 00 00
```

| | | | | | | | | | | | | | | | | |
|---|---|---|---|---|---|---|---|---|---|---|---|---|---|---|---|---|
| DE0 | 00 | 00 | 00 | 00 | 00 | 00 | 00 | 00 | 00 | 00 | 00 | 00 | 00 | 00 | 00 | 00 |
| DF0 | 00 | 00 | 00 | 00 | 00 | 00 | 00 | 00 | 00 | 00 | 00 | 00 | 00 | 00 | 00 | 00 |
| E00 | 00 | 00 | 00 | 00 | 00 | 00 | 00 | 00 | 00 | 00 | 00 | 00 | 00 | 00 | 00 | 00 |
| E10 | 00 | 00 | 00 | 00 | 00 | 00 | 00 | 00 | 00 | 00 | 00 | 00 | 00 | 00 | 00 | 00 |
| E20 | 00 | 00 | 00 | 00 | 00 | 00 | 00 | 00 | 00 | 00 | 00 | 00 | 00 | 00 | 00 | 00 |
| E30 | 00 | 00 | 00 | 00 | 00 | 00 | 00 | 00 | 00 | 00 | 00 | 00 | 00 | 00 | 00 | 00 |
| E40 | 00 | 00 | 00 | 00 | 00 | 00 | 00 | 00 | 00 | 00 | 00 | 00 | 00 | 00 | 00 | 00 |
| E50 | 00 | 00 | 00 | 00 | 00 | 00 | 00 | 00 | 00 | 00 | 00 | 00 | 00 | 00 | 00 | 00 |
| E60 | 00 | 00 | 00 | 00 | 00 | 00 | 00 | 00 | 00 | 00 | 00 | 00 | 00 | 00 | 00 | 00 |
| E70 | 00 | 00 | 00 | 00 | 00 | 00 | 00 | 00 | 00 | 00 | 00 | 00 | 00 | 00 | 00 | 00 |
| E80 | 00 | 00 | 00 | 00 | 00 | 00 | 00 | 00 | 00 | 00 | 00 | 00 | 00 | 00 | 00 | 00 |
| E90 | 00 | 00 | 00 | 00 | 00 | 00 | 00 | 00 | 00 | 00 | 00 | 00 | 00 | 00 | 00 | 00 |
| EA0 | 00 | 00 | 00 | 00 | 00 | 00 | 00 | 00 | 00 | 00 | 00 | 00 | 00 | 00 | 00 | 00 |
| EB0 | 00 | 00 | 00 | 00 | 00 | 00 | 00 | 00 | 00 | 00 | 00 | 00 | 00 | 00 | 00 | 00 |
| EC0 | 00 | 00 | 00 | 00 | 00 | 00 | 00 | 00 | 00 | 00 | 00 | 00 | 00 | 00 | 00 | 00 |
| ED0 | 00 | 00 | 00 | 00 | 00 | 00 | 00 | 00 | 00 | 00 | 00 | 00 | 00 | 00 | 00 | 00 |
| EE0 | 00 | 00 | 00 | 00 | 00 | 00 | 00 | 00 | 00 | 00 | 00 | 00 | 00 | 00 | 00 | 00 |
| EF0 | 00 | 00 | 00 | 00 | 00 | 00 | 00 | 00 | 00 | 00 | 00 | 00 | 00 | 00 | 00 | 00 |
| F00 | 00 | 00 | 00 | 00 | 00 | 00 | 00 | 00 | 00 | 00 | 00 | 00 | 00 | 00 | 00 | 00 |
| F10 | 00 | 00 | 00 | 00 | 00 | 00 | 00 | 00 | 00 | 00 | 00 | 00 | 00 | 00 | 00 | 00 |
| F20 | 00 | 00 | 00 | 00 | 00 | 00 | 00 | 00 | 00 | 00 | 00 | 00 | 00 | 00 | 00 | 00 |
| F30 | 00 | 00 | 00 | 00 | 00 | 00 | 00 | 00 | 00 | 00 | 00 | 00 | 00 | 00 | 00 | 00 |
| F40 | 00 | 00 | 00 | 00 | 00 | 00 | 00 | 00 | 00 | 00 | 00 | 00 | 00 | 00 | 00 | 00 |
| F50 | 00 | 00 | 00 | 00 | 00 | 00 | 00 | 00 | 00 | 00 | 00 | 00 | 00 | 00 | 00 | 00 |
| F60 | 00 | 00 | 00 | 00 | 00 | 00 | 00 | 00 | 00 | 00 | 00 | 00 | 00 | 00 | 00 | 00 |
| F70 | 00 | 00 | 00 | 00 | 00 | 00 | 00 | 00 | 00 | 00 | 00 | 00 | 00 | 00 | 00 | 00 |
| F80 | 00 | 00 | 00 | 00 | 00 | 00 | 00 | 00 | 00 | 00 | 00 | 00 | 00 | 00 | 00 | 00 |
| F90 | 00 | 00 | 00 | 00 | 00 | 00 | 00 | 00 | 00 | 00 | 00 | 00 | 00 | 00 | 00 | 00 |
| FA0 | 00 | 00 | 00 | 00 | 00 | 00 | 00 | 00 | 00 | 00 | 00 | 00 | 00 | 00 | 00 | 00 |
| FB0 | 00 | 00 | 00 | 00 | 00 | 00 | 00 | 00 | 00 | 00 | 00 | 00 | 00 | 00 | 00 | 00 |
| FC0 | 00 | 00 | 00 | 00 | 00 | 00 | 00 | 00 | 00 | 00 | 00 | 00 | 00 | 00 | 00 | 00 |
| FD0 | 00 | 00 | 00 | 00 | 00 | 00 | 00 | 00 | 00 | 00 | 00 | 00 | 00 | 00 | 00 | 00 |
| FE0 | 00 | 00 | 00 | 00 | 00 | 00 | 00 | 00 | 00 | 00 | 00 | 00 | 00 | 00 | 00 | 00 |
| FF0 | 00 | 00 | 00 | 00 | 00 | 00 | 00 | 00 | 84 | B6 | 30 | 00 | 83 | 38 | 80 | 00 |

What is claimed is:

1. A security system for controlling access to an area comprising:
   - a card reader for reading data stored substantially permanently on cards and for comparing said data to authorization data stored in said reader and for granting access to said area if the card data matches selected authorization data;
   - a central controller for storing authorization data defining who is authorized access to said area during degraded mode conditions comprising times when communication between said card reader and said central controller is not possible and for communicating said authorization data to said card reader during times when communication with said card reader is possible;
   - means electrically connected to said card reader for storing card data which does not match said authorization data, along with information indicating that said card data did not match said authorization data, during degraded mode conditions; and
   - means electrically connected to the card reader for communicating said stored card data and information to the central controller during times when communication between the card reader and the central controller is possible.

2. A security system as defined in claim 1 further comprising;
   - means in said reader for communicating, during times when communication with said central controller exists, data read from said card to said central controller;
   - means in said central controller for evaluating said data read from said card to determine whether access should be granted; and
   - means in said central controller for sending a message to said card reader instructiön said card reader whether or not to grant access.

3. A security system as defined in claim 1 or 2 including a plurality of card readers and wherein said central controller includes:
   - first means for storing data regarding which of said readers is authorized to grant access during times when communication with said card reader is lost;
   - second means for storing authorization data comprising I.D. data identifying which persons are to be authorized access by each card reader; and
   - third means for receiving requests from any of said readers for downloading of authorization data and for determining if said requesting reader is authorized to grant access during degraded mode conditions by consulting said first means and for consulting said second means to find the I.D. data for all persons to be authorized access through the requesting reader during degraded mode conditions and for sending said authorization data to said requesting reader for storage.

4. An apparatus as defined in claim 1 wherein said reader includes means for requesting downloading of authorization data from said central controller after initial power up of the reader.

5. An apparatus as defined in claim 1 wherein said card reader reads a card storing system code data and I.D. data.

6. An apparatus as defined in claim 5 wherein the authorization data comprises system code data and I.D. data, and wherein said card reader includes means for granting or denying access based on either the system code card data alone or upon both the system code and the I.D. data on said card.

7. An apparatus as defined in claim 6 wherein the I.D. data in a given card identifies a person authorized to use said given card, and wherein the means for storing said card data comprises means for storing the I.D. data for all persons granted access during degraded mode conditions for later communication to said central controller.

8. An apparats as defined in claim 7 further comprising means for storing the time that each person was granted access.

9. An apparatus as defined in claim 6 wherein the means for storing said card data comprises means for storing records comprising the I.D. data for each person that was either granted or denied access during degraded mode operation for later transmission to said central controller when communications are restored.

10. An apparatus as defined in claim 9 wherein said records include the time of the transaction and wherein the stored information indicating whether the card data matched the authorization data comprises information in said records reflecting either a "Go" transaction where access was granted or a "No Go" transaction where access was denied.

11. An apparatus as defined in claim 5 wherein said card reader includes a keyboard and includes means for granting or denying access board on the system code and the I.D. data on the card and on a password entered by the card holder on said keyboard.

12. A security system comprising:

a central controller;

a plurality of card reader means coupled to said central controller for reading data stored substantially permanently on magnetic card and transmitting said data to said central controller when communication with said central controller is possible and for comparing the card data to authorization data stored in said card reader means in order to make a local decision whether to grant access during times when communication with said central controller is not possible, said authorization data comprising identification data stored in each said reader which identifies those persons authorized access to controlled areas through the associated reader during times when communication with said central controller is not possible;

storage means in each of said card reader means for storing data read from a card which does not match the authorization data and information indicating access was not granted and time of day access was not granted based on said data read from said card during times when communication between said central controller and said card reader means is not possible;

means in said card reader means for communicating said stored data and information to said central controller during times when communication between said card reader and said central controller is possible;

means in said central controller for receiving card data transmitted from said plurality of card reader means when communication with said card reader means is possible and for deciding whether to grant access based upon said card data and for transmitting a message to the card reader means that sent the card data, causing said card reader means either to grant or deny access; and means in said central controller for determining when a particular card reader means is requesting a download of authorization data and for determining whether the requesting card reader means is authorized to grant access during times when communication between the card reader means and the central controller is not possible and for finding the authorization data for each person authorized to have access through said requesting card reader means during said times when said communication is not possible and for sending said authorization data to said card reader means for storage when said communication is possible.

13. A method of operating a security system which includes a card reader and a central controller capable of communicating with the card reader to control access comprising the steps of:

reading a card to derive from said card data stored substantially permanently on said card;

sensing whether communication between said central controller and said card reader is possible;

sending said card data to said central controller if communication with said central controller is possible;

determining in said central controller if access is to be granted;

sending a message from said central controller to said reader indicating whether access is to be granted or denied;

granting or denying access to the area controlled by said card reader based upon said message from said central controller;

comparing said card data to data stored in said card reader during times when communication with said central controller is not possible;

granting or denying access based upon said comparison;

storing card data which does not match said data stored in said reader, and information indicating that access was not granted based upon said card data which does not match, in said card reader during times when communication with said central controller is not possible; and sending the stored card data and information to the central controller during times when communication between the card reader and the central controller is possible.

14. A method of operating a security system which includes a central controller and a card reader, the method comprising the steps of:

loading in a buffer within the card reader, identification data designating persons authorized access during times when communication between the card reader and the central controller is not possible;

sensing when communication between the card reader and the central controller is not possible;

reading card data from a card, said card data comprising system code data and identification code data stored substantially permanently on said card;

comparing said system code data to a first set of data stored in said card reader;

comparing said identification code data to a second set of data stored in said card reader;

storing the identification code data as a record in a buffer in the card reader when said identification code data does not match data in said first set of data or when said system code data does not match data in said second set of data;

marking the record as a "No Go" transaction; and sending the stored identification code data to the central controller during times when communication between the card reader and the central controller is possible.

15. A method of operating a security system as defined in claim 14, further comprising the steps of:

sensing when said card reader needs to be loaded with identification data designating persons authorized access during degraded mode times when communication between the card reader and the central controller is not possible;

determining whether said card reader is authorized to grant access during degraded mode times;

locating the identification data for all persons to whom access may be granted by the requesting card reader during degrade mode times; and transmitting said identification data to said requesting card reader for storage and use by said card reader in granting and denying access during times when communication with said central controller is not possible.

16. A method of operating a security system having a plurality of card readers and a central controller comprising the steps of:

storing in said central controller identification data designating persons authorized access to areas controlled by each card reader;

transmitting the identification data stored in the central controller and associated with a particular card reader to that card reader during times when communication with said card reader is possible;

comparing, in a card reader and independent of said central controller, data read from a card to data stored in said card reader during times when communication between said card reader and said central controller are not possible, to determine whether said card reader should grant access to the card holder;

storing data read from said card which does not match data stored in said card reader and information indicating that access was not granted based upon said data which does not match data stored in the card reader, in said card reader during times when communication between the card reader and the central controller is not possible; and sending the stored data read from the card and the information indicating access was not granted to the central controller during times when communication between the card reader and the central controller is possible.

17. A method of operating a security system as defined in claim 16, further comprising the step of storing, along with said data from the card, the corresponding time at which access was denied in response to the comparison of said data.

18. A security as defined in claim 12, wherein the storage means further comprises means for storing the time of day corresponding to each transaction in which access was denied.

19. A method of operating a security system as defined in claim 13, further comprising the step of storing, along with said data from the card, the corresponding time at which access was denied in response to the comparison of said data.

20. A method of operating a security system as defined in claim 14, further comprising the step of loading said identification code data from the central controller to the card reader during times when communication between the card reader and the central controller is possible.

21. A card reader for use in a security system having a central controller which communicates with said card reader, said card reader comprising:

mean so for storing authorization information identifying persons to whom access may be granted by the card reader;

means for reading data stored permanently on a card;

means, which are independent of the central controller, for comparing data from the card with the authorization information and for selectively granting access to a controlled location based on said comparison of card data and authorization information; means for receiving signals from the central controller;

means electrically coupled to said receiving means for sensing when communication with the central controller is not possible;

means responsive to said sensing means for storing, during periods when communication between the card reader and the central controller is not possible, card data which does not match authorization data, along with associated information indicating that access was denied in response to the comparison of said card data with the authorization information; and means electrically connected to the storing means for sending the stored card data and associated information to the central controller during times when communication between the card reader and the central controller is possible.

22. A card reader as defined in claim 21, wherein the means for storing said card data and said associated access information comprises means for storing with said card data and access information, the time of day at which access was denied as a result of the comparison of the corresponding card data and access information.

23. A method of operating a security system which controls access to a location and which includes a local card reader and a central controller which communicate to limit access based on card data, comprising:

storing authorization information at said local card reader, said authorization information identifying persons to whom access may be granted by the card reader;

reading data stored permanently on a card;

comparing, independently from the central controller, data from the card with the authorization information;

selectively granting access to a controlled location based on said comparison of card data and authorization information;

sensing at said local card reader for inability to communicate with said central controller;

storing at said card reader during periods when communication between the card reader and the central controller is not possible card data which does not match authorization data, along with associated information indicating that access was denied in response to the comparison of said card data with said authorization information; and sending the stored card data and associated information to the central controller during times when communication between the card reader and the central controller is possible.

24. A method of operating a security system as defined in claim 23, further comprising the step of storing with said card data and access information, the time of day at which access was denied as a result of the comparison of the corresponding card data and access information.

25. A method of operating a security system as defined in claim 23, further comprising the step of transmitting the stored card data and access information to the central controller when communication between the card reader and the central controller is possible.

* * * * *

UNITED STATES PATENT AND TRADEMARK OFFICE
CERTIFICATE OF CORRECTION

PATENT NO. : 4,816,658
DATED : March 28, 1989
INVENTOR(S) : Khandwala et al.

It is certified that error appears in the above-identified patent and that said Letters Patent is hereby corrected as shown below:

Column 1 line 18, please correct "accesss" to --access--.

Column 8, line 39, please correct "caused" to --causes--.

Column 9, line 27, please correct "CSRAMO" to --CSRAMØ--.

Column 9, line 28, please correct "CSRAMO" to --CSRAMØ--.

Column 18, lines 26-27, please correct "algorithms" to --algorithm--.

Column 25, line 67, please correct "instruction" to --instructing--.

Column 27, line 1, please correct "apparats" to --apparatus--.

Column 27, line 19, please correct "board" to --based--.

Column 27, line 26, please correct "card" to --cards--.

Column 29, line 66, please correct "mean so for" to --means for--.

Signed and Sealed this

Third Day of July, 1990

*Attest:*

HARRY F. MANBECK, JR.

*Attesting Officer*

*Commissioner of Patents and Trademarks*